(12) United States Patent
Glueck et al.

(10) Patent No.: US 9,996,244 B2
(45) Date of Patent: *Jun. 12, 2018

(54) USER INTERFACE NAVIGATION ELEMENTS FOR NAVIGATING DATASETS

(71) Applicant: AUTODESK, INC., San Rafael, CA (US)

(72) Inventors: Michael Glueck, Toronto (CA); Azam Khan, Aurora (CA); Michael Lee, Mississauga (CA)

(73) Assignee: AUTODESK, INC., San Rafael, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 13/802,527

(22) Filed: Mar. 13, 2013

(65) Prior Publication Data
US 2014/0282268 A1 Sep. 18, 2014

(51) Int. Cl.
*G06F 3/0482* (2013.01)
*G06F 3/0485* (2013.01)

(52) U.S. Cl.
CPC ........ *G06F 3/04855* (2013.01); *G06F 3/0482* (2013.01); *G06F 2203/04806* (2013.01)

(58) Field of Classification Search
CPC .................................................. G06F 3/0481
USPC ....................................................... 715/771
See application file for complete search history.

(56) References Cited

U.S. PATENT DOCUMENTS

| 5,528,735 | A | * | 6/1996 | Strasnick | G06F 3/04815 345/427 |
| 5,550,559 | A | * | 8/1996 | Isensee | G06F 3/04855 345/684 |
| 5,553,225 | A | * | 9/1996 | Perry | G06F 3/04855 345/660 |
| 5,655,094 | A | * | 8/1997 | Cline | G06F 3/04855 345/684 |
| 6,430,574 | B1 | * | 8/2002 | Stead | G06F 3/0482 |
| 7,479,947 | B2 | * | 1/2009 | Pihlaja | G06F 1/1626 345/156 |

(Continued)

OTHER PUBLICATIONS

Office Action dated Mar. 3, 2015 for U.S. Appl. No. 13/802,545.
Office Action dated Jan. 13, 2015 for U.S. Appl. No. 13/802,588.

*Primary Examiner* — Reza Nabi
*Assistant Examiner* — Daniel Rodriguez
(74) *Attorney, Agent, or Firm* — Artegis Law Group, LLP

(57) ABSTRACT

One embodiment of the invention sets forth a data navigation engine that generates user interface navigation elements for navigation large and expanding datasets. The user interface navigation elements may include a pivot control zoom slider for adjusting the data resolution with respect to different zoom pivot locations, an interactive ruler for consistent visual feedback and navigation of intervals of data within the dataset, a context bar for viewing the data proximate to a current view, and a multi-scale slider for repositioning the dataset within the current view. These user interface navigation elements provide the end-user with consistent control and visual feedback while navigating the dataset, independent of the size of the dataset or the portion of the dataset displayed within the current view. Therefore, large and expanding datasets can be navigated more effectively relative to prior art approaches.

26 Claims, 21 Drawing Sheets

(56) References Cited

U.S. PATENT DOCUMENTS

| | | | | |
|---|---|---|---|---|
| 7,934,169 B2* | 4/2011 | Reponen | | G06F 3/0236 |
| | | | | 715/784 |
| 8,082,518 B2* | 12/2011 | Flake | | G06F 3/0481 |
| | | | | 715/785 |
| 8,253,704 B2* | 8/2012 | Jang | | G06F 3/0485 |
| | | | | 345/173 |
| 8,522,157 B2* | 8/2013 | Park | | G06F 3/048 |
| | | | | 715/758 |
| 2002/0063733 A1* | 5/2002 | Franke | | G06Q 40/04 |
| | | | | 715/739 |
| 2002/0109709 A1 | 8/2002 | Sagar | | |
| 2002/0109728 A1 | 8/2002 | Tiongson et al. | | |
| 2002/0149605 A1* | 10/2002 | Grossman | | G06F 3/0485 |
| | | | | 345/660 |
| 2002/0154173 A1 | 10/2002 | Etgen et al. | | |
| 2003/0095095 A1* | 5/2003 | Pihlaja | | G06F 1/1626 |
| | | | | 345/156 |
| 2003/0120423 A1* | 6/2003 | Cochlovius | | G01C 21/3614 |
| | | | | 701/455 |
| 2004/0083247 A1* | 4/2004 | Koont | | G06F 3/04845 |
| | | | | 708/160 |
| 2004/0257340 A1* | 12/2004 | Jawerth | | G01C 21/3664 |
| | | | | 345/157 |
| 2006/0190833 A1* | 8/2006 | SanGiovanni | | G06F 3/04883 |
| | | | | 715/767 |
| 2007/0192744 A1* | 8/2007 | Reponen | | G06F 3/0236 |
| | | | | 715/833 |
| 2008/0034316 A1* | 2/2008 | Thoresson | | G06F 3/04855 |
| | | | | 715/781 |
| 2008/0148177 A1* | 6/2008 | Lang | | G06F 3/0481 |
| | | | | 715/784 |
| 2008/0189658 A1* | 8/2008 | Jeong | | G06F 3/0482 |
| | | | | 715/810 |
| 2008/0235616 A1* | 9/2008 | Neervoort | | G06F 3/0485 |
| | | | | 715/784 |
| 2009/0100366 A1 | 4/2009 | Fitzmaurice et al. | | |
| 2010/0017740 A1 | 1/2010 | Gonzalez Veron et al. | | |
| 2010/0058228 A1* | 3/2010 | Park | | G06F 3/04847 |
| | | | | 715/786 |
| 2010/0064239 A1* | 3/2010 | Crawford | | G06F 17/30265 |
| | | | | 715/771 |
| 2010/0070888 A1* | 3/2010 | Watabe | | G06F 3/0481 |
| | | | | 715/760 |
| 2010/0115390 A1* | 5/2010 | Desantis | | G06F 17/245 |
| | | | | 715/212 |
| 2010/0146435 A1* | 6/2010 | Cros | | G06F 3/04855 |
| | | | | 715/786 |
| 2010/0152807 A1 | 9/2010 | Dang et al. | | |
| 2010/0302176 A1* | 12/2010 | Nikula | | G06F 3/04883 |
| | | | | 345/173 |
| 2011/0035700 A1* | 2/2011 | Meaney | | G06F 3/048 |
| | | | | 715/784 |
| 2011/0137548 A1* | 6/2011 | Shen | | G06F 1/1694 |
| | | | | 701/533 |
| 2012/0162265 A1* | 6/2012 | Heinrich | | G06Q 10/06393 |
| | | | | 345/661 |
| 2012/0272182 A1* | 10/2012 | Jitkoff | | G06F 3/0485 |
| | | | | 715/786 |
| 2013/0042180 A1* | 2/2013 | Sai | | G09B 21/006 |
| | | | | 715/729 |
| 2013/0093727 A1* | 4/2013 | Eriksson | | G06F 1/1616 |
| | | | | 345/175 |
| 2013/0097546 A1* | 4/2013 | Gardenfors | | H04L 12/586 |
| | | | | 715/772 |
| 2013/0113837 A1* | 5/2013 | Kamihara | | G11B 27/034 |
| | | | | 345/660 |
| 2013/0229373 A1* | 9/2013 | Eriksson | | G06F 1/1616 |
| | | | | 345/173 |
| 2013/0332810 A1* | 12/2013 | Lin | | G06F 17/24 |
| | | | | 715/212 |
| 2014/0005931 A1* | 1/2014 | Ono | | G01C 21/00 |
| | | | | 701/445 |
| 2014/0026061 A1* | 1/2014 | Kim | | G06F 3/0605 |
| | | | | 715/739 |
| 2014/0115544 A1* | 4/2014 | Chi | | G06F 3/0488 |
| | | | | 715/863 |
| 2014/0129971 A1* | 5/2014 | King | | G06F 17/30064 |
| | | | | 715/772 |
| 2014/0149947 A1* | 5/2014 | Blyumen | | G06F 17/30 |
| | | | | 715/863 |
| 2014/0164988 A1* | 6/2014 | Barnett | | G06F 3/0481 |
| | | | | 715/790 |
| 2015/0331969 A1* | 11/2015 | Dahlen | | G06F 17/50 |
| | | | | 703/1 |

* cited by examiner

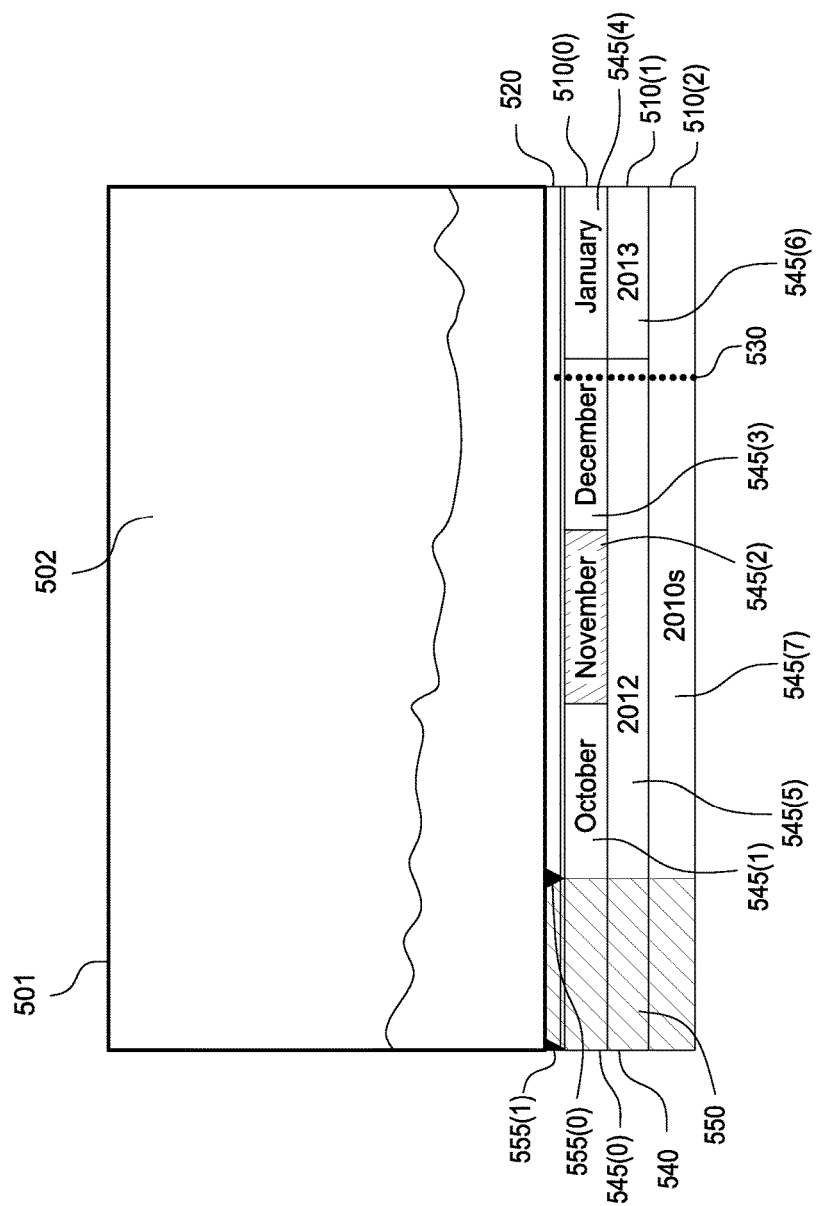

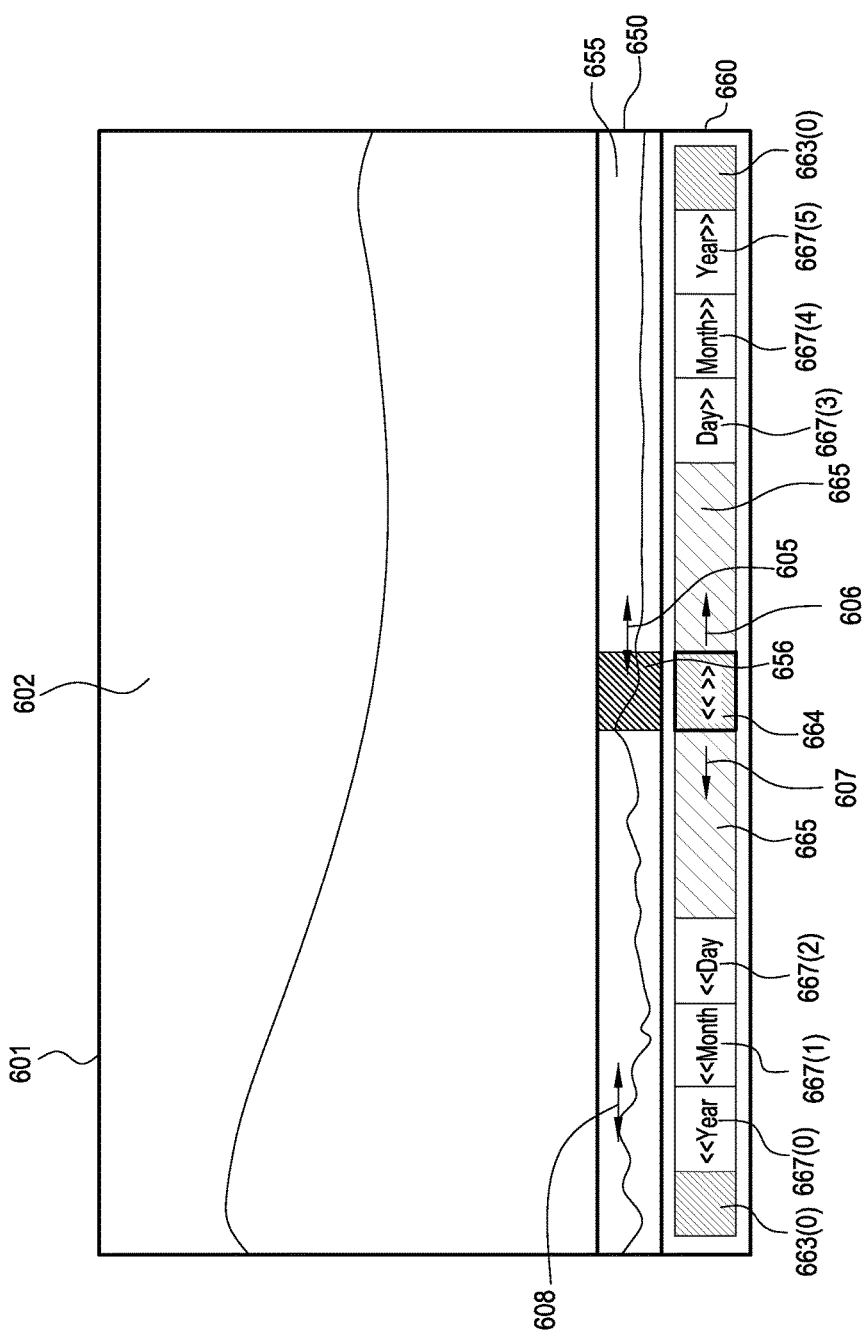

USER INTERFACE NAVIGATION ELEMENTS FOR NAVIGATING DATASETS

BACKGROUND OF THE INVENTION

Field of the Invention

Embodiments of the present invention generally relate to data analysis and, more specifically, to user interface navigation elements for navigating datasets.

Description of the Related Art

A datasets is oftentimes examined by viewing a portion of the dataset in an application viewport. In such implementations, user interface navigation elements that pan and zoom the current view are used to navigate through the dataset. The same or additional user interface navigation elements also provide a context of which portion of the entire dataset an end-user is currently viewing. Typical user interface navigation elements may include scroll bars for repositioning the current view in the dataset and to provide context, rulers to represent the scale of the current view of the data, context bars for providing the context of the current view relative to the entire dataset, and zoom sliders for adjusting the data resolution of the current view.

Conventional user interface navigation elements and data resolution scaling techniques are generally sufficient for conventionally sized static datasets. Traditionally, applications map a dataset to the display space of an application viewport, and the user interface navigation elements are used to navigate through that particular spatial representation of the dataset. A dataset maps to the display space at a particular data resolution, so that a certain number of pixels represents a certain quantity of data. For instance, 100 pixels in a display space may represent a day's worth of data.

The user interface navigation elements also map to the dataset such that each pixel of a user interface navigation element represents a certain quantity of the dataset. For example, in a scroll bar, the position and size of a scroll thumb on a scroll track represents the position of a current view relative to an entire dataset as well as the amount of data displayed in the current view relative to the total size of the dataset. If a day of data in a dataset that spans 10 days is represented by 100 pixels, then each pixel in a 100 pixel wide scroll bar would map to 10 pixels worth of data in the display space or one tenth of a day of data.

Although the mapping of a dataset to a user interface navigation element is generally sufficient for conventionally sized datasets, large and expanding datasets are difficult to map and scale to existing user interface navigation elements.

For example, one drawback of navigating datasets with traditional user interface navigation elements is that the mapping of a dataset to a given user interface navigation element, such as a scroll bar, can break down as the dataset increases in size and expands. This phenomenon is known as the sub-pixel-pitch problem. The sub-pixel-pitch problem arises because the number of pixels within a scroll bar is finite, and those pixels have to be mapped to the data in the dataset to enable navigation. Consequently, as the dataset expands, each pixel of the scroll bar maps to a larger and larger amount of data. At some point in the dataset expansion, each pixel of a scroll bar represents too large of an amount of data to navigate through the dataset, at a reasonable level of data resolution. The movement of the scroll thumb by even a single pixel results in a large jump through the dataset, completely skipping portions of the dataset.

For instance, if the ten days of data in the example above were expanded to 100 days of data, but the data resolution remained at 100 pixels of display space for each day of data, then each pixel of the scroll bar would map to 100 pixels worth of data or one day of data. If the 100 days of data continued to expand to 200 days of data, but the data resolution remained at 100 pixels of display space for each day of data, then each pixel of the scroll bar would map to 200 pixels worth of data or two days of data. In such a case, the movement of a scroll thumb on the scroll bar by even one pixel would result in a jump through the dataset of two days, completely skipping a day's worth of data.

Another drawback of navigating datasets with traditional user interface navigation elements is that maintaining a section of interest in the viewport while zooming in and out becomes increasingly difficult as the dataset increases in size and expands. The on-screen user interface navigation element traditionally used to control data resolution scaling is a zoom slider, which includes a handle that is moved along a track to change the data resolution. As the handle is moved, the data resolution changes by either zooming in or out from a single zoom pivot location within the viewport. In such an implementation, if the zoom pivot location is located at the center of the viewport, then the current view zooms-in or zooms-out from that center location. Consequently, when the end-user wants to zoom-into a particular section of the current view that is not located close to the center location of the viewport, the end-user may first have to zoom to change the data resolution and then reposition the current view in order to view the desired section of the dataset. For example, if an application is designed to zoom-into the center of the viewport and the end-user zooms in to examine in more detail data located on the left side of the viewport, then the change in data resolution may cause the data the end-user wants to examine to move out of the viewport. In such a case, the end-user would then have to use a scroll bar to move the current view to the left. Repositioning the current view to a different location is not only an extra step, but also becomes increasingly difficult for large and expanding datasets because the scroll bar may skip over the desired location.

As the foregoing illustrates, what is needed in the art is a more effective approach for navigating large and expanding datasets.

SUMMARY OF THE INVENTION

One embodiment of the present invention sets forth a method for navigating data included in a large data set. The method includes receiving a request to perform a zoom operation, determining whether the zoom operation is a zoom-in operation, determining a zoom pivot location associated with the zoom operation, and performing the zoom operation relative to the zoom pivot location.

Other embodiments of the present invention include, without limitation, a computer-readable storage medium including instructions that, when executed by a processing unit, cause the processing unit to implement aspects of the approach described herein as well as a system that includes different elements configured to implement aspects of the approach described herein.

One advantage of the disclosed technique is that the user interface navigation elements provide the end-user with consistent control and visual feedback while navigating the dataset, independent of the size of the dataset or the portion of the dataset displayed within the current view. Therefore, large and expanding datasets can be navigated more effectively relative to prior art approaches.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5F illustrate an interactive ruler in conjunction with a current view, according to one embodiment of the present invention;

FIGS. 6A-6D illustrate a context bar 350 and a multi-scale slider 360 in conjunction with the current view 220, according to one embodiment of the present invention;

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
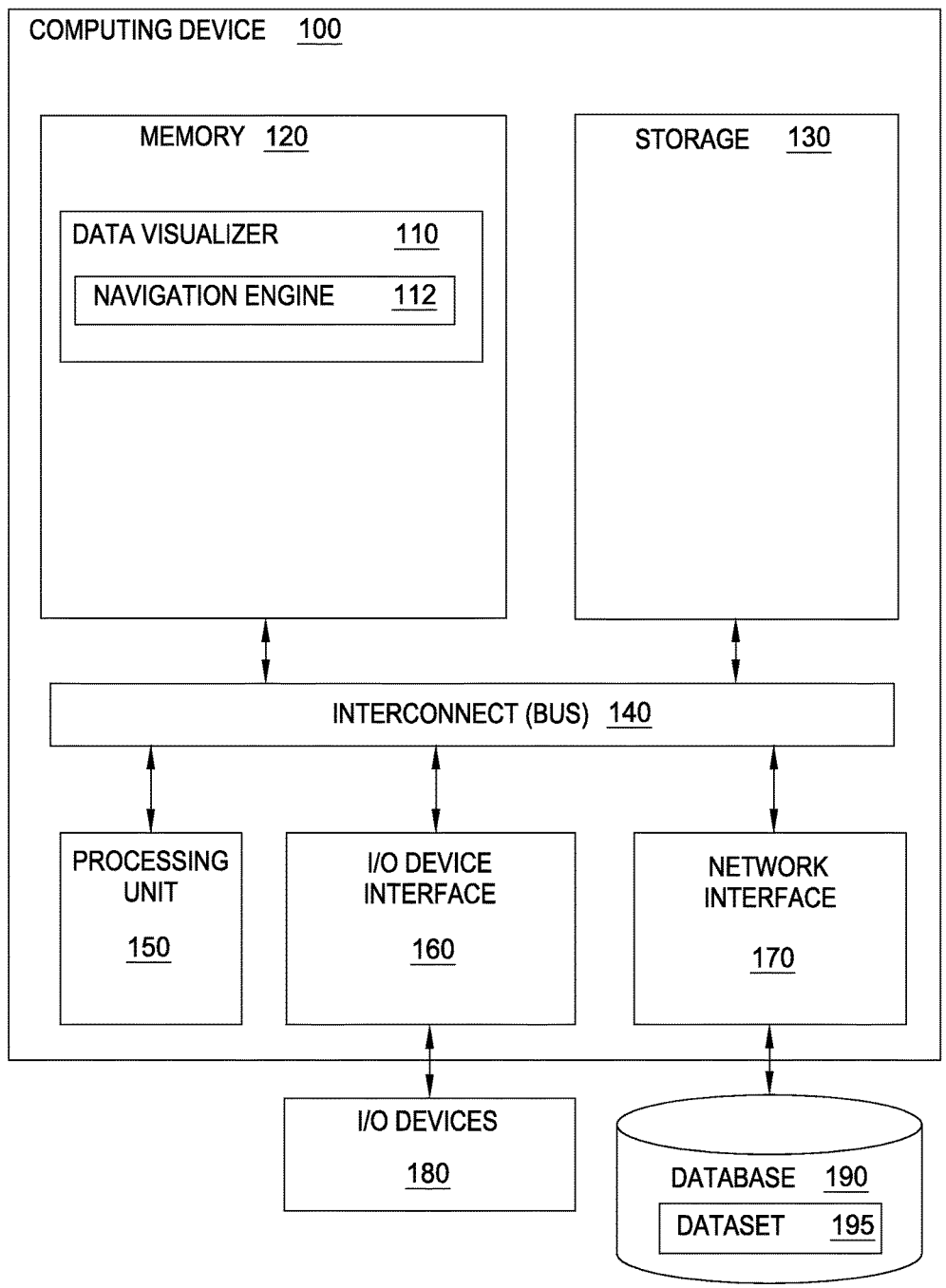
FIG. 1 illustrates a computing device configured to implement one or more aspects of the present invention.

FIG. 1 illustrates a computing device 100 configured to implement one or more aspects of the present invention. As shown, computing device 100 includes a interconnect (bus) 140 that connects a processing unit 150, an input/output (I/O) device interface 160 coupled to input/output (I/O) devices 180, a memory 120, a storage 130, and a network interface 170 coupled to a database 190 that includes a dataset 195. Processing unit 150 may be a central processing unit (CPU), a graphics processing unit (GPU), or a combination of different processing units, such as a CPU configured to operate in conjunction with a GPU. In general, processing unit 150 may be any technically feasible hardware unit capable of processing data and/or executing software applications. Further, in context of this disclosure, the computing elements shown in computing device 100 may correspond to a physical computing system (e.g., a system in a data center) or may be a virtual computing instance executing within a computing cloud.

I/O devices 180 may include devices capable of receiving input, such as a keyboard, a mouse, a video camera, a three-dimensional (3D) scanner, and so forth, as well as devices capable of providing output, such as a display device, a speaker, and so forth. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100.

Memory 120 is generally included to be representative of a random access memory (RAM) module, a flash memory unit, or any other type of memory unit or combination thereof. Processing unit 150, I/O device interface 160, and network interface 170 are configured to read data from and write data to memory 120. The storage 130 may be a disk drive storage device. Although shown as a single unit, the storage 130 may be a combination of fixed and/or removable storage devices, such as fixed disc drives, removable memory cards, or optical storage, network attached storage (NAS), or a storage area-network (SAN). In some embodiments, the database 190 may be located in the storage 130. In such a case, the database queries and subsequent responses are transmitted over the bus 140.

As also shown, memory 120 includes a data visualizer 110 that, in one embodiment, is a software application that may be executed by the processing unit 150. The data visualizer 110 is configured to control and present a visualization of a dataset 195 retrieved from the database 190. The data visualizer 110 is also configured to generate a graphical user interface (GUI) on a display device via the I/O device interface 160, through which various navigation elements for viewing and interacting with the dataset 195 are provided to the end-user.

The data visualizer 110 includes a data navigation engine 112. As discussed in detail below in conjunction with FIGS. 3-9 the data navigation engine 112 is configured to provide navigation elements within the GUI that enable the end-user to control which portions of the dataset 195 are presented to the end-user in different "current" views of the dataset 195. The navigation elements may include, among others, a viewport, pivot control zoom slider, interactive ruler, context bar, and multi-scale slider, or a combination thereof. In response to input received from the end-user, the data navigation engine 112 is configured to retrieve a portion of the dataset 195 from the database repository 190. The data navigation engine 112 then presents the retrieved portion of the dataset 195 to the end-user via the GUI.

Figure 2:
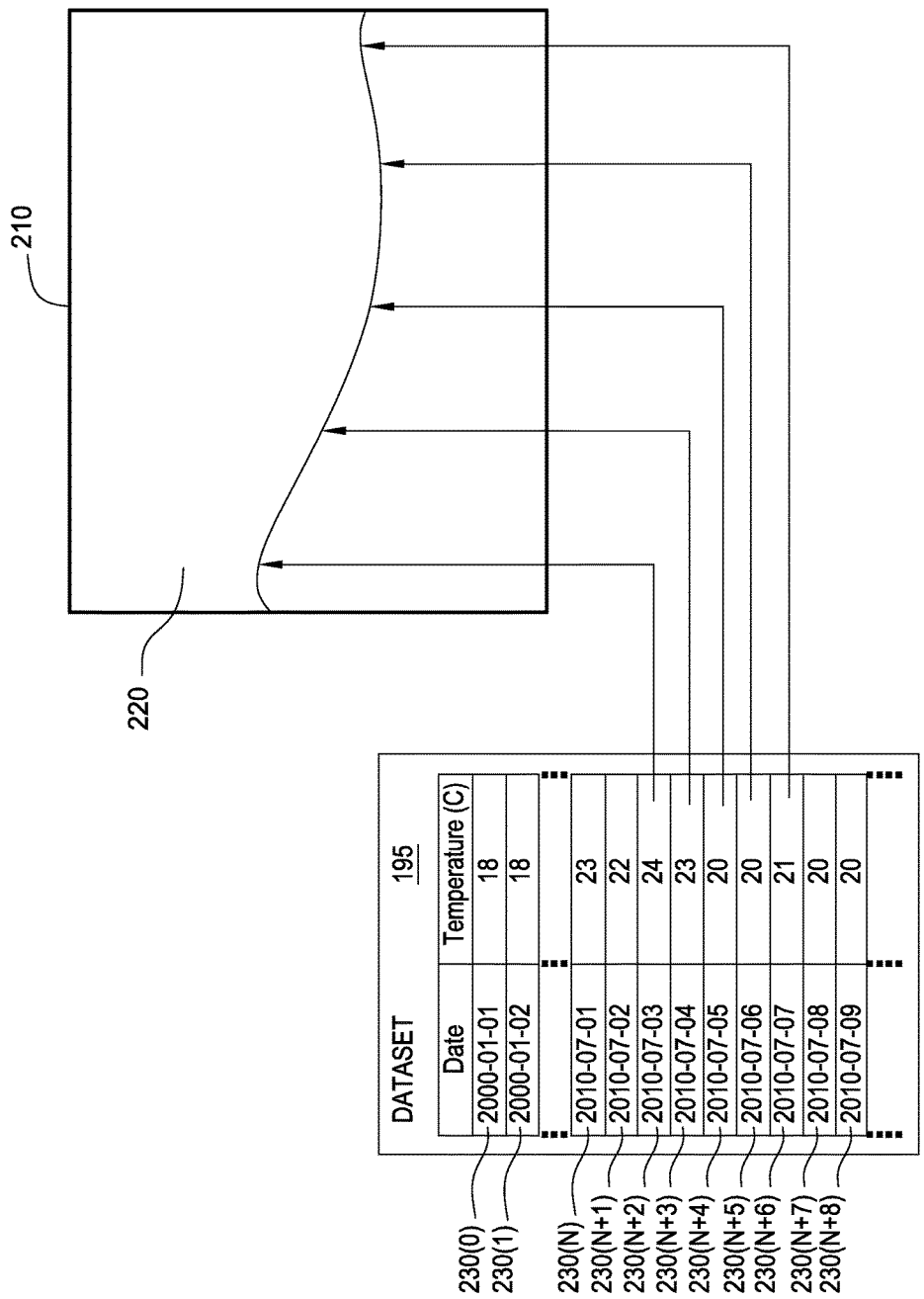
FIG. 2 illustrates the mapping of a portion of a dataset to a current view, according to one embodiment of the present invention.

FIG. 2 illustrates the mapping of a portion of the dataset 195 to a current view 220, according to one embodiment of the present invention. As shown, the dataset 195 includes data points 230. The current view 220 is generated within a viewport 210 by data navigation engine 112. In various embodiments, the data visualizer 110 displays the contents of the viewport 210 to an end-user through the GUI generated on the display device. In operation, the data navigation engine 112 maps the dataset 195 to the display space of the viewport 210 by creating a spatial representation of the dataset 195. To display the dataset 195 at a data resolution that is understandable to the end-user, the data navigation engine 112 displays only a portion of the spatial representation of the dataset 195 in the viewport 210. The portion of the spatial representation of the dataset 195 that the data navigation engine 112 displays in the viewport 210 is the current view 220. Thus, the current view 220 can be thought of as a spatial representation of a portion of the dataset 195.

For example, suppose the dataset 195 includes daily measurements, stored as data points 230, of the temperature of a building from Jan. 1, 2000 through the present. If the end-user is attempting to analyze the effect of installing a new heating system in the building on Jul. 5, 2010, then the data navigation engine 112 can present the data points 230(N+2)-230(N+6) from the five-days surrounding the installation date. Assuming that the viewport 210 is 500 pixels wide, the data navigation engine 112 would create the current view 220 by mapping the five data points 230(N+2)-230(N+6) from the dataset 195 to a spatial representation that is 500 pixels wide and display this current view 220 to the end-user in the viewport 210. In this example, as well as various other examples discussed herein, a uniformly-sampled dataset 195 is assumed for the sake of simplicity only. Persons skilled in the art will recognize that the present invention is equally applicable to a dataset 195 that is not uniformly sampled.

As a general matter, the dataset 195 can include data points 230 based on data units commonly used to measure the type of data in the dataset 195. For instance, a dataset 195 recording temperature data may include data points 230 recorded in the data units of degrees Celsius. The data points 230 can be organized based on a regular interval commonly used to record the type of data in the dataset 195. For instance, a dataset 195 may be organized into data points 230 stored at one-second intervals or one-day intervals. Other units of measurements could also be possible, and so data points 230 could also be stored at one-centimeter or one-meter intervals. The data navigation engine 112 is configured to identify additional intervals that are typical combinations of the interval used to organize the data points 230 within the dataset 195. Each additional interval represents a particular number of data points 230. The different intervals may be used to present the dataset 195 at different levels of granularity, where the interval representing a single data point 230 is the finest level of granularity. For example, if the data in the dataset 195 is organized based on one-day intervals, then additional temporally-based intervals, such as months, years, decades, etc. may be used to present the data in the dataset 195. In this example, an interval of a "month" could represent 30 data points 230 and be used to present the data in the dataset 195 at a "fine" level of granularity, and an interval of a "decade" could represent 3,652 data points 230 and be used to present the data in the dataset 195 at a "coarse" level of granularity. Other intervals also fall within the scope of the invention. For example, if the data in the dataset 195 is organized based on one-centimeter intervals, then additional length-based intervals may be used to present the data in dataset 195, such as e.g. meters or kilometers.

As referred to herein, a "zoom level" corresponds to a particular number of data points 230 represented within the current view 220. The data navigation engine 112 determines the number of data points 230 to represent within the current view 220 based on a currently active zoom level. If the active zoom level corresponds to 5,000 data points 230, then the current view 220 represents 5,000 data points 230 from the dataset 195. The active zoom level and the width of the viewport 210 determine the data resolution of the current view 220. If, the active zoom level corresponds to 5,000 data points 230 and the viewpoint 210 is 500 pixels wide, then the data resolution could be described as 10 data points 230 per pixel.

The data navigation engine 112 is configured to identify the largest interval that fits within the current view 220 as the interval associated with the active zoom level. The data navigation engine 112 may also identify the next largest interval, which would include the number of data points 230 represented in the current view 220, and the next smallest interval, which would fit within the current view 220 multiple times. For instance, if the dataset 195 was organized in one-day intervals and the data navigation engine 112 displayed a current view 220 based on an active zoom level of 60 data points 230, then a month interval, 30 data points 230, would be associated with the active zoom level as the largest interval that fits within the current view, a year interval, 365 data points 230, would be the next larger interval, and a day interval, one data point, would be the next smallest interval. As described in greater detail below in conjunction with FIG. 5A-5F the data navigation engine 112 is configured to generate a set of "interval elements" that indicate to the end-user the different intervals associated with the data points 230 within the current view 220.

Figure 3:
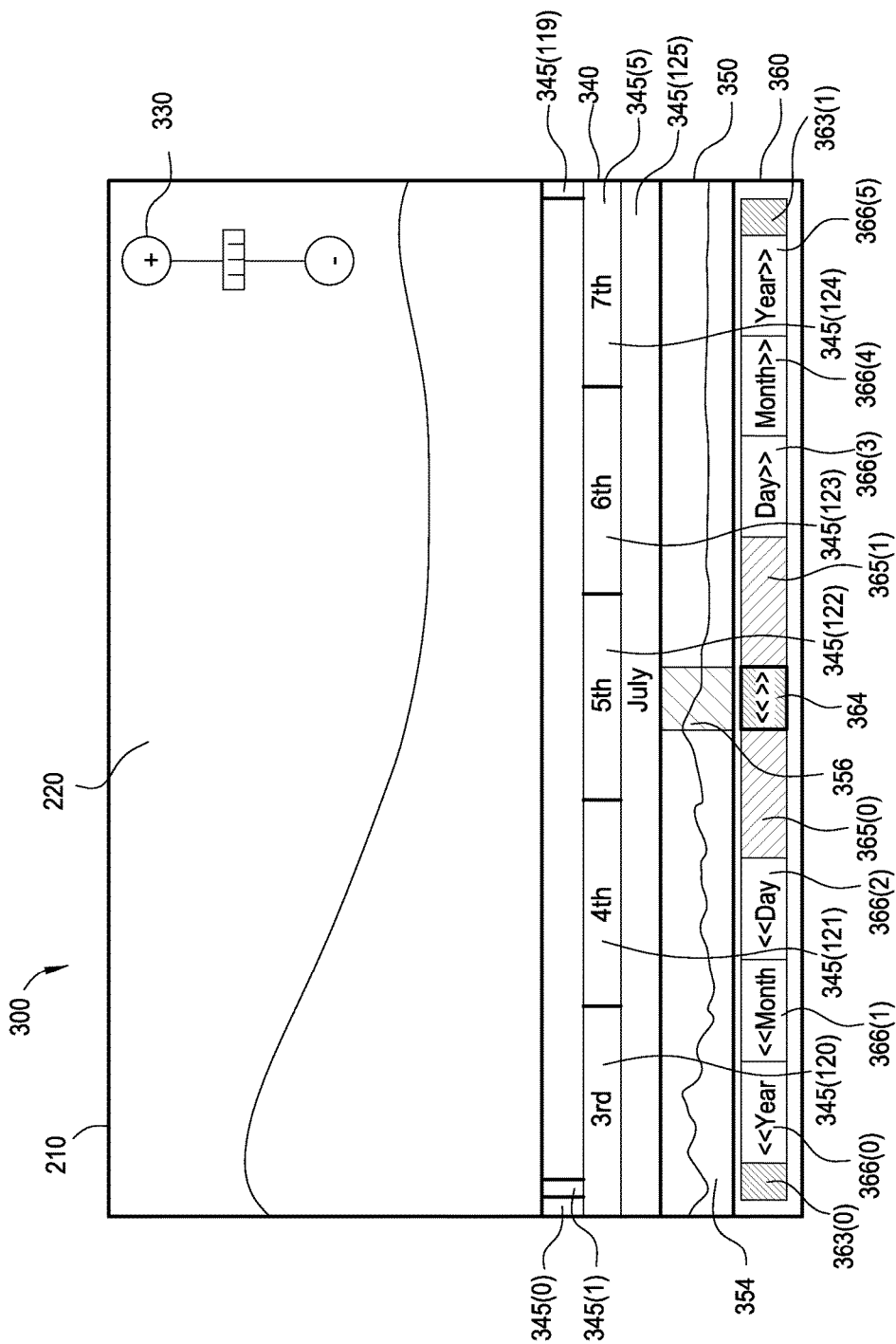
FIG. 3 illustrates navigation elements provided in a graphical user interface (GUI) by a data visualizer, according to one embodiment of the present invention.

FIG. 3 illustrates different navigation elements provided in a GUI 300 by the data visualizer 110, according to one embodiment of the present invention. As shown, the GUI 300 includes, without limitation, the viewport 210 through which the current view 220 of the dataset 195 is presented to the end-user as well as a pivot control zoom slider 330, an interactive ruler 340, a context bar 350, and a multi-scale slider 360.

The pivot control zoom slider 330 is a user interface navigation element that enables the end-user to adjust the zoom level. The pivot control zoom slider 330 allows the end-user to select a zoom pivot location when performing a zoom operation. The zoom pivot location is a point in the viewport 210 from which the current view 220 zooms-in or zooms-out. By controlling the zoom pivot location while zooming in or out, the end-user is able to keep the portion of the dataset 195 surrounding the zoom pivot location in the current view 220. The features and functions of the pivot control zoom slider 330 are discussed in greater detail below in conjunction with FIGS. 4A-4C.

The interactive ruler 340 is a user interface navigation element that enables the end-user to interact with the dataset 195 based on intervals derived from the active zoom level. As shown, the interactive ruler 340 is divided into a plurality of interval elements 345. Each interval element 345 represents a different interval derived from the dataset 195. The intervals elements 345 are set forth in units of measurement commonly used to record the type of data in the dataset 195. For example, if the dataset 195 included temporal data, then the interval elements 345 would be presented with temporal units of measurement, such as hours or days. The interactive ruler 340 also shows the end-user the portion of the dataset 195 to which the current view 220 is mapped. In operation, the end-user is able to view different intervals of the dataset 195 within the current view 220 by selecting interval elements 345 of the interactive ruler 340 corresponding to the intervals of the dataset 195 the end-user wants to view. Selecting different interval elements 345 allows the end-user to perform specific zooms and/or pans of the data within and adjoining the current view 220. The features and functions of the interactive ruler 340 are discussed in greater detail below in conjunction with FIGS. 5A-5F.

The context bar 350 is a user interface navigation element that enables a end-user to see the data surrounding the current view 220. As shown the context bar 350 includes a context view 354 and a local context indicator 356. The context view 354 displays a larger portion of the dataset 195 at a lower data resolution than the current view 220. The larger portion of the dataset 195 encompasses the data within and surrounding the current view 220. The local context indicator 356 highlights the region of the context view 354 that corresponds to the current view 220. As the end-user moves the dataset 195 through the current view 220, the dataset 195 also moves through the context bar 350. The features and functions of the context bar 350 are discussed in greater detail below in conjunction with FIGS. 6A-6D.

The multi-scale slider 360 is a user interface navigation element that enables an end-user to move the dataset 195 through the current view 220 and displays the relationship between the size of active zoom level and the size of the dataset 195. As shown, the multi-scale slider 360 includes a scroll thumb 364 and stepping buttons 366 that allow the end-user to either pan the adjoining data through the current view 220 or move through the dataset 195 by a specific interval. Additionally, the multi-scale slider 360 includes bumpers 363 and a paging region 365 that relate the size of the active zoom level to the size of the entire dataset 195. The bumpers 363 and paging region 365 expand and shrink horizontally as the end-user performs any zoom within the current view 220. The features and functions of the multi-scale slider 360 are discussed in greater detail below in conjunction with FIGS. 6A-6D.

In various embodiments, the data navigation engine 112 may be configured to generate and present one or more of the pivot control zoom slider 330, interactive ruler 340, multi-scale slider 360, and context bar 350, or any combination thereof, to the end-user via the GUI 300 to allow the end-user to more effectively navigate large and expanding datasets.

Figure 4A:
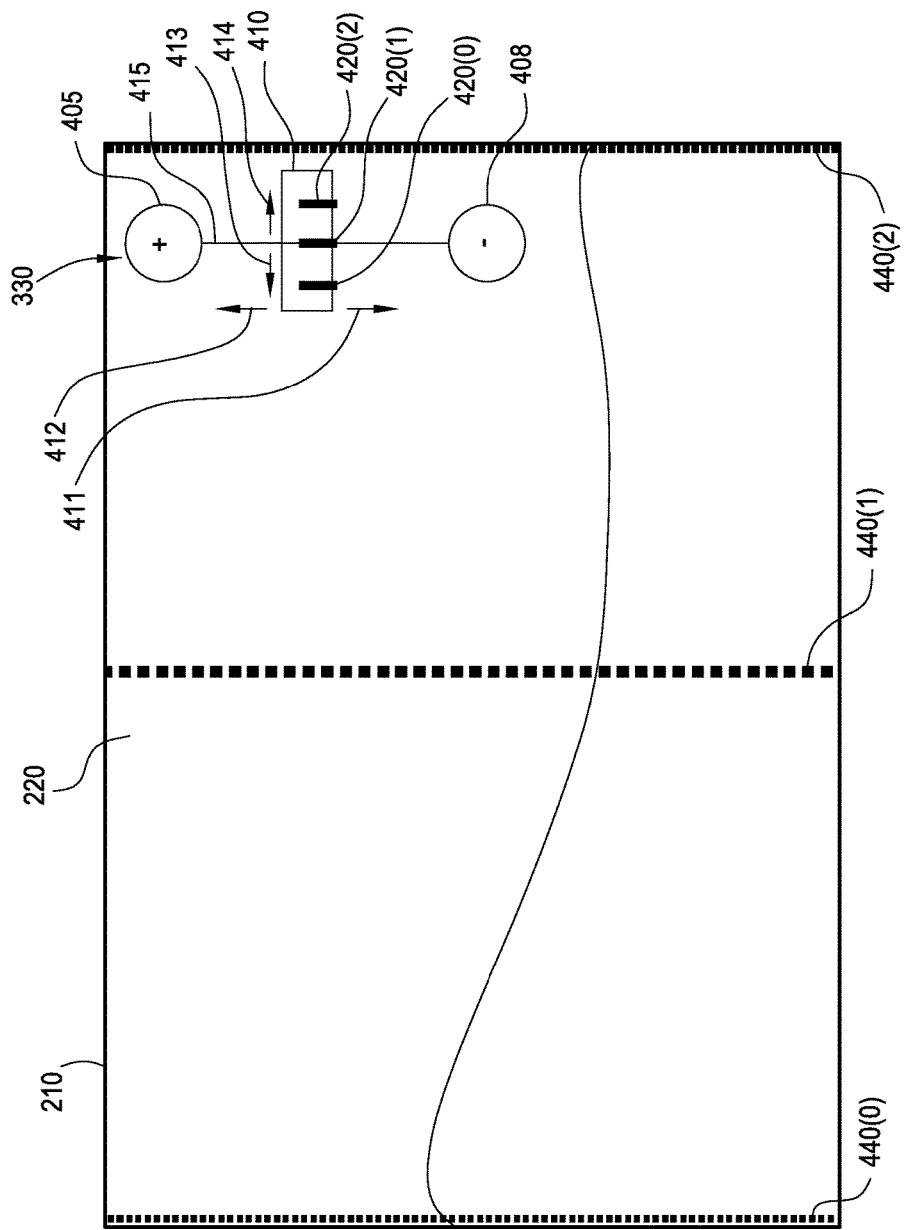
FIGS. 4A-4C illustrate a pivot control zoom slider within a current view, according to various embodiments of the present invention.
Figure 4B:
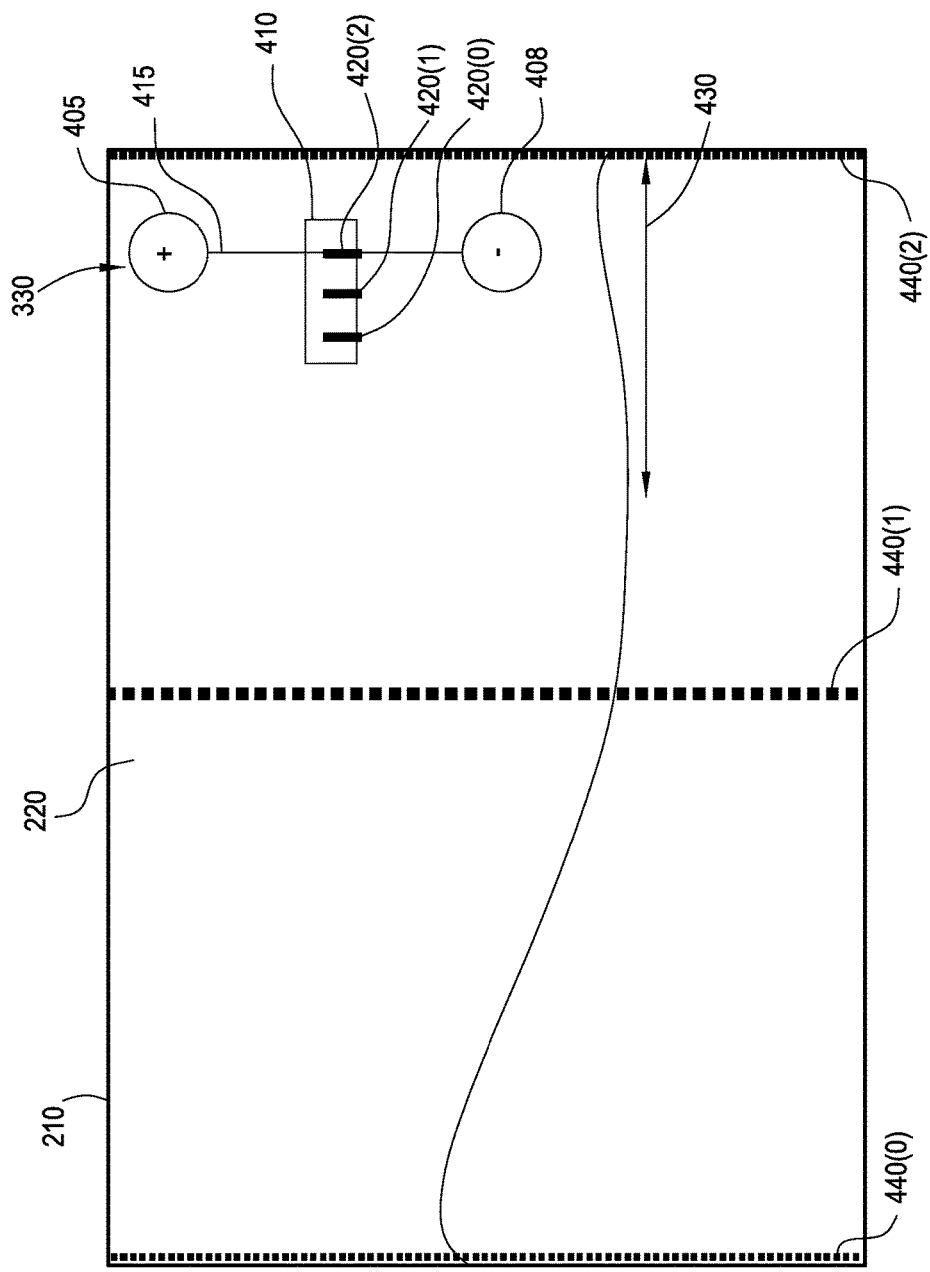
Figure 4C:
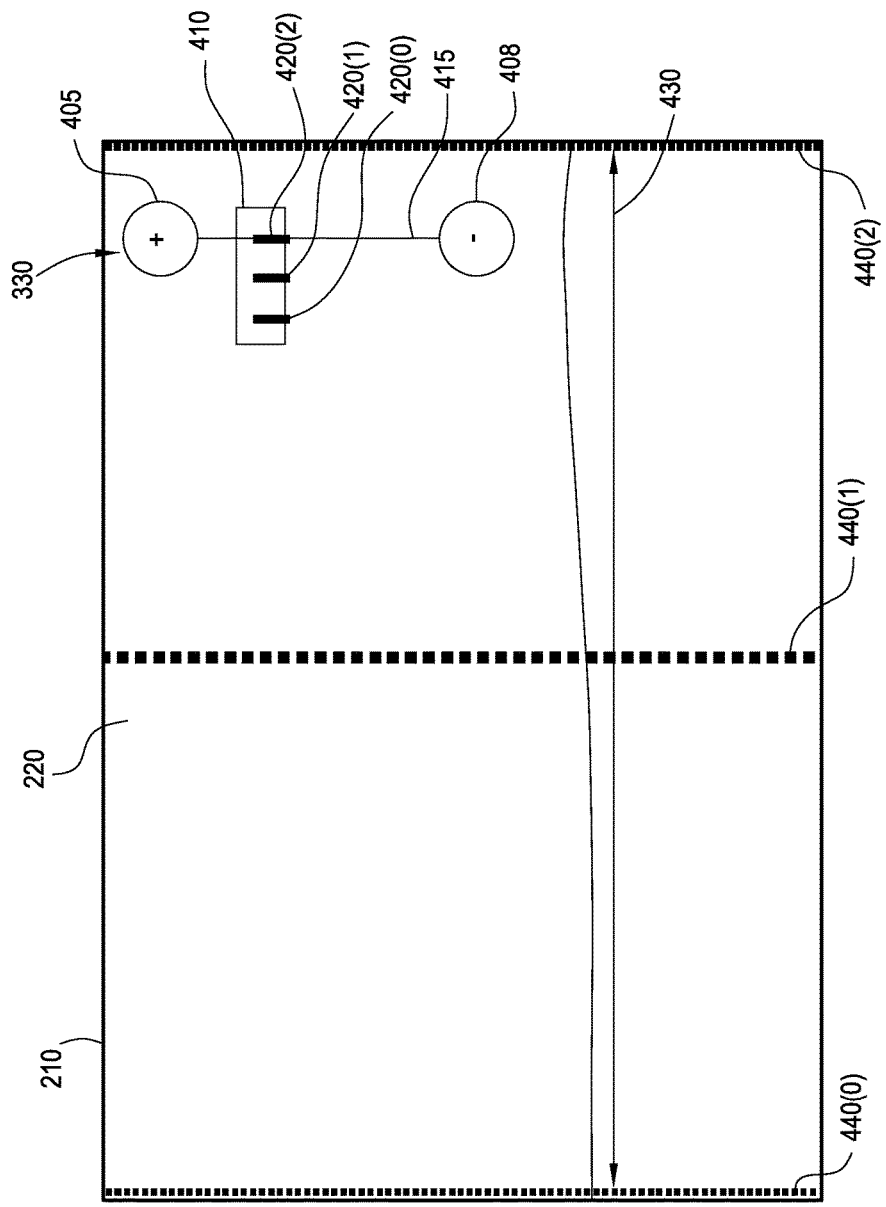

FIGS. 4A-4C illustrate a pivot control zoom slider 330 within the current view 220, according to various embodiments of the present invention. As shown in FIG. 4A, the pivot control zoom slider 330 includes, without limitation, a step-in button 405, a step-out button 408, and a handle 410 positioned on a track 415. The track 415 runs between the step-in button 405 and the step-out button 408.

In operation, to perform a zoom-in operation with the pivot control zoom slider 330, the end-user can select the step-in button 405 or move the handle 410 up the track 415, in the direction of arrow 412. In response to a zoom-in operation, the data navigation engine 112 zooms-in one or more zoom levels and advances the handle 410 up the track 415 by one or more corresponding positions, as the case may be. The position of the handle 410 on the track 415 corresponds to the active zoom level. In changing the active zoom level, the data navigation engine 112 reduces the number of data points 230 displayed in the current view 220. In one embodiment, sequential groups of pixels within the track 415 map to sequential zoom levels, such that there are more pixels in the track 415 than zoom levels. In other embodiments, the track 415 may be marked to distinguish between the different zoom levels.

To perform a zoom-out operation, the end-user can select the step-out button 408 or move the handle 410 down the track 415, in the direction of arrow 411. In response to a zoom-out operation, the data navigation engine 112 zooms-out one or more zoom levels, thereby reducing the number of data points 230 displayed in the current view 220, and advances the handle 410 down the track 415 by one or more corresponding positions, as the case may be. In changing the active zoom level, the data navigation engine 112 increases the number of data points 230 displayed in the current view 220.

As also shown in FIG. 4A, to control where the data navigation engine 112 adds or trims data, the pivot control zoom slider 330 allows the end-user to select a zoom pivot location 440 when performing a zoom operation. More specifically, with the pivot control zoom slider 330, the end-user has the ability to perform a zoom operation with respect to a specific portion of the dataset 195 shown within the current view 220 by selecting the zoom pivot location 440(0), 440(1), or 440(2). To perform a zoom operation with respect to data on the left side of the current view 220, the end-user would select zoom pivot location 440(0). To perform a zoom operation with respect to data in the middle of the current view 220, the end-user would select zoom pivot location 440(1). Similarly, to perform a zoom operation with respect to data on the right side of the current view 220, the end-user would select zoom pivot location 440(2). Note, the zoom pivot locations 440 are shown in FIG. 4A to illustrate locations within the viewport 210 and are not necessarily displayed during operation. Further, the zoom pivot location 440(1) is shown with larger bullets to indicate that the zoom pivot location 440(1) is the currently selected zoom pivot location 440.

The handle 410 includes three marks 420(0), 420(1), and 420(2) that map to the three zoom pivot locations 440(0), 440(1), and 440(2), respectively. To select one of the zoom pivot locations 440(0), 440(1), or 440(2), the end-user moves the handle 410 horizontally to center either the mark 440(0), 440(1), or 440(2) over the track 415. Thus, to perform a zoom operation with respect to data on the left side of the current view 220, the end-user would center the left mark 420(0) over the track 415, by moving the handle 410 in the direction of arrow 414. To perform a zoom operation with respect to data in the middle of the current view 220, the end-user would center the middle mark 420(1) over the track 415. Similarly, to perform a zoom operation with respect to data on the right side of the current view 220, the end-user would center the right mark 420(2) over the track 415, by moving the handle 410 in the direction of arrow 413.

Prior to the end-user performing a zoom operation, the handle 410 may be located at a default position or, in embodiments where there is no default position, the handle 410 may be located at the last-selected horizontal position. In embodiments having a default handle position, the zoom pivot location 440 corresponding to the default handle position would be the default zoom pivot location 440. For example, with respect to FIG. 4A, if the default position of the handle 410 were to correspond to the handle 410 being positioned with mark 420(1) over the track 415, then the zoom pivot location 440(1) would be the default zoom pivot location 440.

Turning now to FIG. 4B, to select a new zoom pivot location 440 that is different from the current zoom pivot location 440(1) of FIG. 4A, the end-user may move the handle 410 until a mark other than mark 402(1) is positioned over the track 415. For example, to select the zoom pivot location 440(2), the end-user would center the right mark 420(2) over the track 415. Again, the zoom pivot location 440(2) is illustrated with larger bullets to indicate that zoom pivot location 440(2) is the currently selected zoom pivot location 440 within the current view 220. Once the new zoom pivot location 440(2) is selected, the end-user can perform a zoom operation with respect to that selected zoom pivot location 440(2).

In that vein, FIG. 4C shows a zoom-in operation with respect to the zoom pivot location 440(2) selected in FIG. 4B. To perform the zoom-in operation, the end-user moves the handle 410 up toward the step-in button 405. In response, the data navigation engine 112 automatically pans the dataset 195 to the left while updating the active zoom level to a zoom level that represents fewer data points 230. The portion of the dataset 195 displayed in the right side of the current view 220, as shown by arrow 430 in FIG. 4B, expands from the zoom pivot location 440(2) across the entire current view 220, as shown by arrow 430 in FIG. 4C.

For example, the zoom-in operation with respect to the zoom pivot location 440(2) keeps the last day of data in the current view 220 by automatically panning the dataset 195 to the left within the current view 220 as the number of data points 230 decreases. Likewise, to perform a zoom-out operation with respect to the zoom pivot location 440(2), the end-user could move the handle 410, as positioned in FIG. 4B, down toward the step-out button 408. In response, the data navigation engine 112 would automatically pan the dataset 195 to the right while updating the active zoom level to a zoom level that represents more data points 230. The portion of the dataset displayed in the current view 220, would contract toward the zoom pivot location 440(2). For example, a zoom-out operation with respect to the zoom pivot location 440(2) would keep the last day of data at the right of the current view 220 as data points 230 are added to the left of the current view 220. As the foregoing illustrates, with the pivot control zoom slider 330, the end-user is advantageously able to perform a pan and zoom within the current view 220 with a single zoom operation, instead of with multiple operations.

The embodiments illustrated in FIGS. 4A-4C are illustrative only and in no way limit the scope of the present invention. In other embodiments, various modifications of the feature and functions of the pivot control zoom slider 330 are contemplated. For example, although the portion of the dataset 195 displayed in the current view 220 expands or contracts horizontally when performing a zoom-in or a zoom-out operation, in different embodiments, the data navigation engine 112 could be configured to expand or contract the portion of the dataset 195 vertically or vertically and horizontally. Further, in different embodiments, the data navigation engine 112 may be configured to allow an end-user to select multiple zoom pivot locations 440 during a particular zoom operation dynamically, i.e. as the data contracts or expands. By continuously updating the zoom pivot location 440 while zooming, the end-user can zoom-in to a precise section of the dataset 195 with one zoom operation. In addition, although the handle 410 is described with three marks 420 corresponding to three zoom pivot locations 440, in different embodiments, the viewport 210 may include any number of useful zoom pivot locations 440 with the handle 410 having the same number of corresponding marks 420. The handle 410 also may display a snapshot of the current view 220 to assist the end-user in selecting a particular zoom pivot location 440. Finally, although the various marks 420 on the handle 410 are shown with equal proportions, in different embodiments, the mark 420(1) may be structured to emphasize the default position. For example, the mark 420(1) may be thicker than marks 420(0) and 420(2).

Figure 5A:
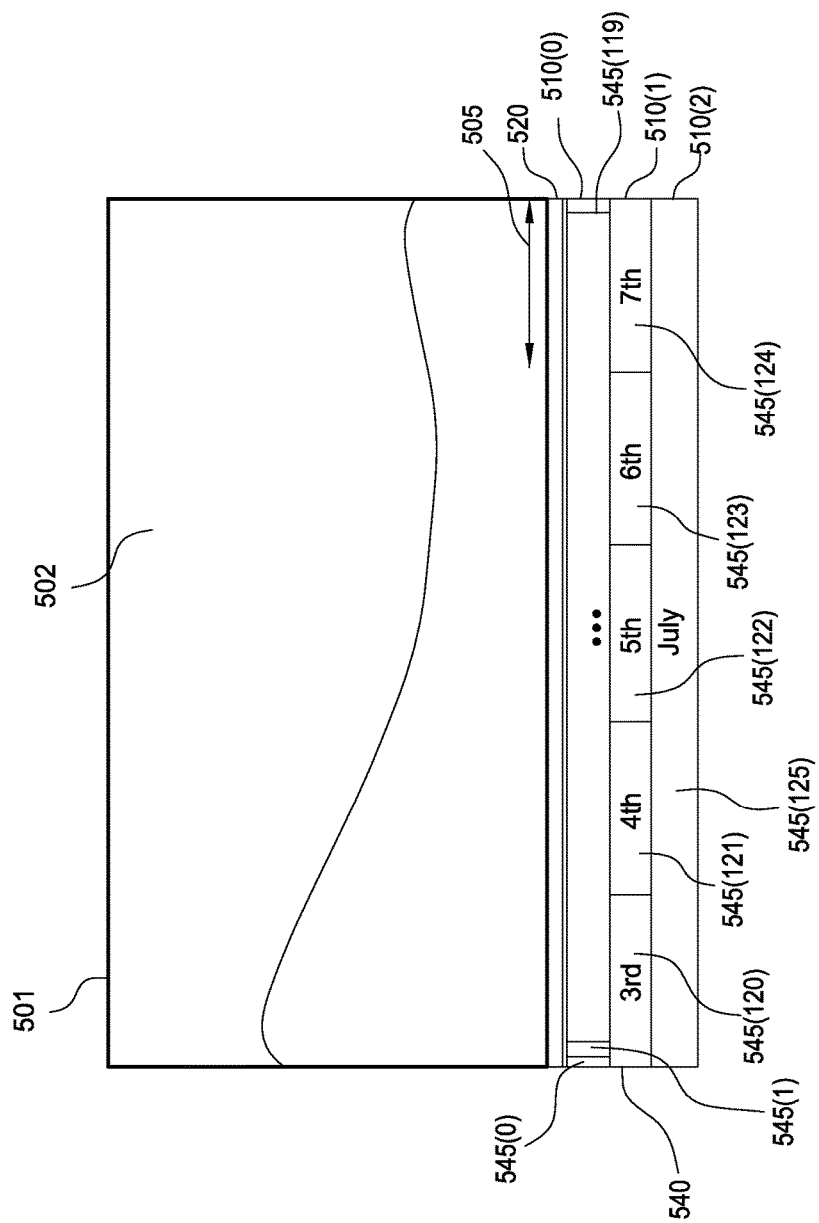

FIGS. 5A-5F illustrate an interactive ruler 540 in conjunction with the current view 502, according to various embodiments of the present invention. As shown in FIG. 5A, an interactive ruler 540 includes rows 510, one or more interval elements 545 associated with each row 510, and a selection track 520.

The current view 602 includes various intervals associated with dataset 195 that may be identified by the data navigation engine 112. Each row 510 of the interactive ruler 540 represents an interval of a different granularity. A row 510 is divided into interval elements 545. Each interval element 545 within a given row represents a different group of data points 230, each having a size that corresponds to the interval associated with the given row. For example, the middle row 510(1) is associated with a "day" interval, and so each interval element 545 within that row corresponds to a different day's worth of data.

The middle row 510(1) is configured to represent the interval associated with the active zoom level. For instance, if the active zoom level corresponds to 7200 data points 230 stored at one-minute intervals, then the data navigation engine 112 would determine that a day interval, 1440 data points 230, is the largest interval that fits within the current view 502, a month interval is the next largest interval, and an hour interval is the next smallest interval. The data navigation engine 112 would associate day intervals with the active zoom level. Then the data navigation engine 112 would generate rows 510(0)-510(2) corresponding to the identified intervals, where each row includes interval element 545(0)-545(125) that represent different groups of data points 230. The interval elements 545(120)-545(125) would each represent 1,440 data points 230, or a day worth of data. Further, if the current view 502 was displayed within a viewport 501 with a width of 500 pixels, then the current view 502 would represent 7200 data points 230 within the width of 500 pixels and each interval element 545(120)-545(124) would represent 1440 data points 230 within the width of 100 pixels. The interval element 545(120)-545(124) may specifically represent the data points 230 recorded from Jul. 3, 2010 through Jul. 7, 2010. The top row 510(0) would include interval elements 545(0)-545(119) that each represent 60 data points 230, or an hour worth of data. The bottom row 510(2) would include an interval element 545(125) that represents the 7200 data points 230 as a portion of a month worth of data.

If the data navigation engine 112 determines that the active zoom level has been changed (e.g. based on input received from the end-user), then the data navigation engine 112 may update the current view 220 to display a different portion of the dataset 195. The data navigation engine 112 would also identify the intervals included within that portion of the dataset 195. For example, the data navigation engine 112 could determine that the active zoom level has been changed, and then update the current view 220 to display 1,440 data points 230 (one day's worth of data) instead of 7,200 data points 230 (5 days' worth of data). The data navigation engine 112 could also identify day, hour, and minute intervals as being shown within the current view 220 that is based on the new active zoom level. The data navigation engine 112 could then display a row 510 corresponding to each identified interval, where each row 510 would include a set of interval elements 545 that represent different groups of data points 230. Each such group would correspond to a particular day, hour, or minute.

In various embodiments, the interactive ruler 540 is configured to be interactive to enable the end-user to perform pan and zoom operations. For example, the end-user can perform a pan operation by clicking a mouse pointer on the GUI 300 displaying the interactive ruler 540 and dragging the mouse pointer horizontally across the GUI 300. In response to the horizontal movement of the mouse pointer, the data navigation engine 112 moves the dataset 195 through the current view 502. If the end-user drags the mouse pointer 200 pixels to the left, then the data navigation engine 112 moves the dataset 195 200 pixels to the left within the current view 502. Likewise, the end-user can perform a zoom operation by clicking a mouse pointer on the display surface displaying the interactive ruler 540 and vertically dragging across the display surface or vertically scrolling with a mouse scroll wheel. The end-user can drag the mouse pointer up or scroll the mouse scroll wheel up to perform a zoom-in operation. The end-user can drag the mouse pointer down or scrolls the mouse scroll wheel down to perform a zoom-in operation. Additionally, the end-user can double-click on a particular interval element 545 to perform automatic pan and zoom operations. In response, the data navigation engine 112 fills the current view 502 with the interval represented by the particular interval element 545. Combined pan and zoom operations are more complex operations, and are discussed in greater detail below in conjunction with FIGS. 5B-5D.

Figure 5B:
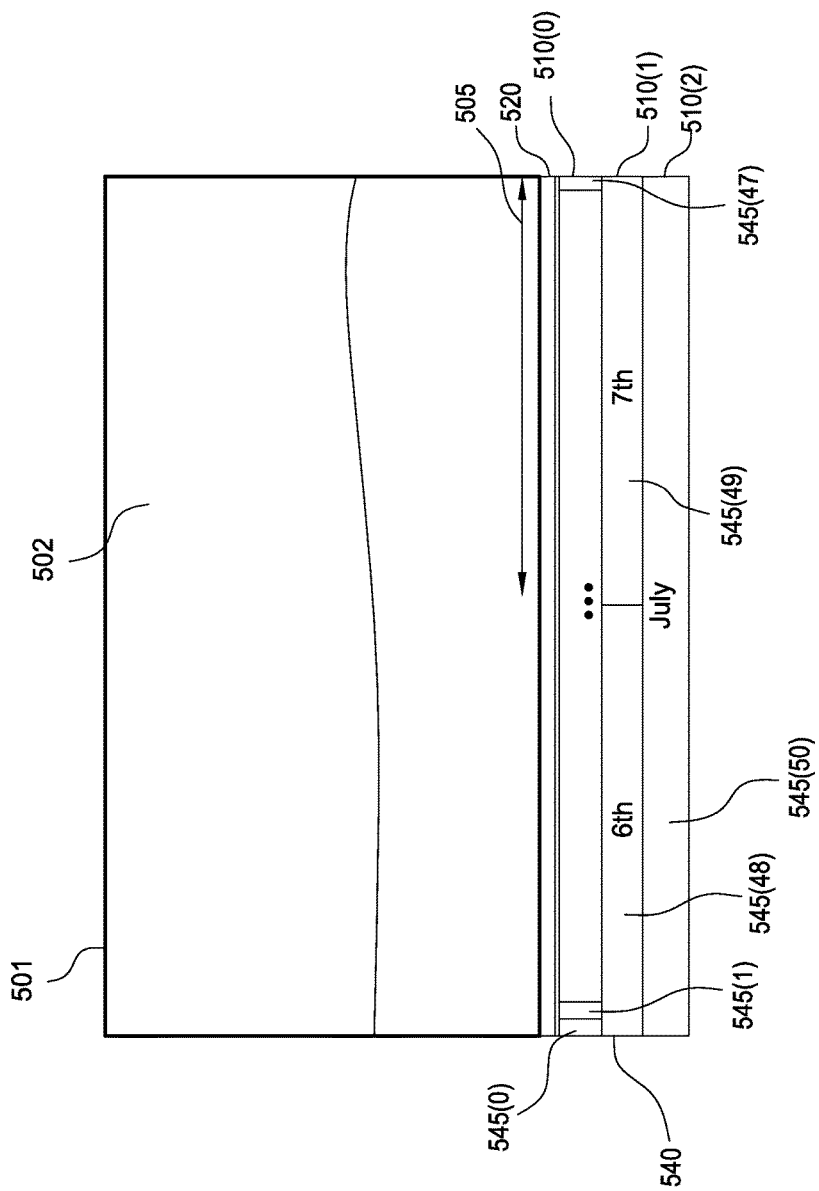

FIG. 5B shows the result of a pan and a zoom-in operation performed within the current view 502 of FIG. 5A, according to one embodiment of the present invention. To perform the pan operation the end-user, for example, first clicks the mouse pointer on the interactive ruler 540, and then drags the mouse pointer to the left. The data navigation engine 112 moves the dataset 195 to the left within the current view 502, as the end-user drags the mouse pointer to the left. The data navigation engine 112 also shifts the interval elements 545 to the left to continually represent the same particular intervals of the dataset 195 within the current view 220. To perform the zoom-in operation the end-user clicks the mouse pointer on the current view 220 and then drags the mouse pointer up. As the end-user drags the mouse pointer up, the data navigation engine 112 changes the active zoom level to zoom levels that correspond to fewer data points 230. The data navigation engine 112 updates the current view 220 to display a larger portion of the dataset 195. The data navigation engine 112 changes the rows 510 to include interval elements 545 that represent the intervals identified from the changing zoom levels. Specifically, the interval element 545(124) represents the interval 505 as associated with the active zoom level shown in Figure A, but the interval element 545(49) represents the same interval 505 as associated with the active zoom level shown in FIG. 5B.

Figure 5C:
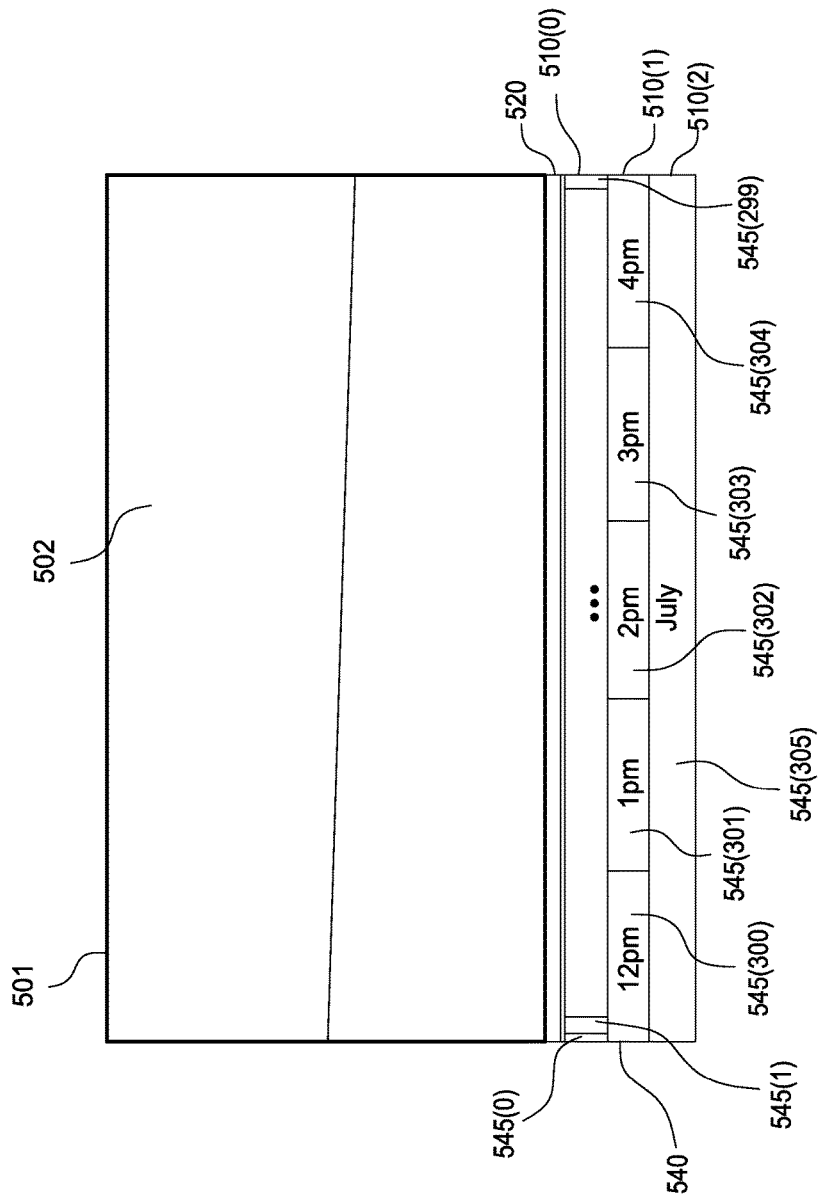

FIG. 5C shows the result of continuing the zoom-in operation performed within the current view 502 of FIG. 5B until the active zoom level changes to a zoom level associated with another interval, according to another embodiment of the present invention. For example, to continue the zoom-in operation the end-user continues to drag the mouse pointer up. In response to the zoom-in operation, the data navigation engine 112 continues to change the active zoom level to correspond with fewer data points 230 and continues to update the current view 502 to display a smaller portion of the dataset 195. As the current view 502 changes, the data navigation engine 112 identifies the intervals included within the new portion of the dataset 195, such as minute, hour, and day intervals. Based on these intervals the data navigation engine 112 then changes the row 510(1) to represent the interval associated with the new active zoom level, by displaying interval elements 545(300)-545(304) that represent the hour interval. The data navigation engine 112 also changes the rows 510(1) and 510(2), by dividing row 510(0) into interval elements 545(0)-545(299) that represent minute intervals, and row 510(2) into interval element 545(305) that represents a portion of a day interval. As the foregoing illustrates, with the interactive ruler 540, the end-user is advantageously able to consistently understand which portion of the dataset 195 is displayed within the current view 502 at varying zoom levels.

Figure 5D:
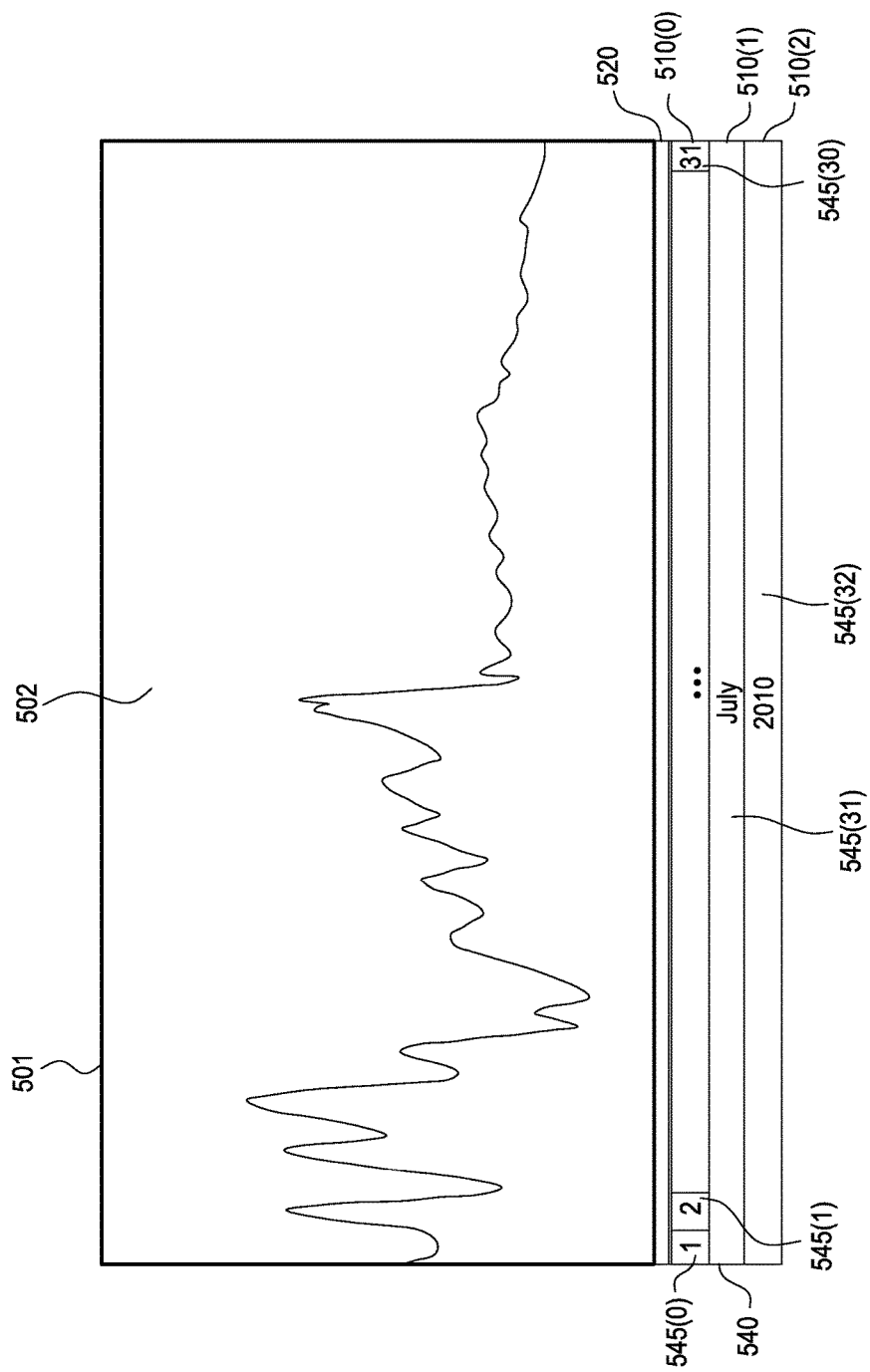

FIG. 5D shows the result of an automatic pan and zoom-out operation performed within the current view 502 of FIG. 5C, according to another embodiment of the present invention. To perform the automatic pan and zoom-out operation the end-user, for example, double clicks the mouse pointer on the interval element 545(125) in FIG. 5A. In FIG. 5A, the interval element 545(125) represents the particular interval of the month of July. In response, the data navigation engine 112 automatically pans the dataset 195 to the left while changing the active zoom level to display more data points 230 within the current view 502. The data navigation engine 112 continues to automatically pan and zoom-out until the data points 230 of the month of July are represented across the entire current view 502, as shown in FIG. 5D. The data navigation engine 112 changes the active zoom level to the zoom level corresponding to the number of data points 230 in the month interval and updates the current view 502. Then data navigation engine 112 changes the rows 510 to represent the interval identified within the new current view 502, by dividing into the interval elements 545(0)-545(33) that represent new intervals. As the foregoing illustrates, with the interactive ruler 540 the end-user is advantageously able to perform automatic pan and zoom-out operations to display a specific unit of data within the current view 502.

As shown in FIG. 5E, in various embodiments, the data navigation engine 112 can also mark an interval element 545(2) to display additional information to the end-user. The data navigation engine 112 marks the interval element 545(2) with a darker background in response to input received from the end-user. For example, the end-user could click a mouse pointer on the display surface displaying the interval element 545(2), to mark the interval element 545(2) as a reminder to review the interval in the dataset 195 corresponding to the month of November. As also shown, the interactive ruler 540 may be configured to display a current time indicator 530. The current time indicator 530 is a vertical line that the data navigation engine 112 displays across the interval elements 545 mapped to the intervals that include the current time. In one embodiment, the current time indicator 530 is disposed directly underneath the portion of the dataset 195 that includes the current time. For example, if the current time were Dec. 23, 2012, then the current time indicator 530 would be displayed across the interval elements 545(3), 545(5), and 545(7).

FIG. 5E also shows the selection of a range of interval elements 545 with the selection track 520, shown as selection area 550. The selection area 550 is generated by the navigation engine 112 in response to input provided by the end-user and reflects a portion of data that the end-user is interested in viewing. The end-user may indicate the portion of data of interest by selecting a range of interval elements 545 via the selection area 550. In response, the navigation engine 112 may update the data shown current view 220, as well as the active zoom level, in order to display an amount of data corresponding to that range with an active zoom level that enables that portion of data to fit within the current view 220.

In one embodiment, the end-user clicks a mouse pointer on the portion of a display surface displaying a location on the selection track 520. In response, the data navigation engine 112 marks the spot on the selection track 520 at the edge of the interval element 545 that is closest to the selected location with a first selection handle 555(0). The end-user then drags the mouse across the display surface displaying the selection track 520 to create a selection area 550. The end-user continues to drag the mouse until the selection 550 encompasses one or more interval elements 545. Once the selection area 550 encompasses the desired interval element(s) 545, the end-user releases the mouse at a second location. The data navigation engine 112 marks the spot on the selection track 520 at the edge of the interval element 545 that is closest to the location where the end-user releases the mouse with a second selection handle 555(1). The selection area 550 spans from the edge of the interval element 545 at the first selection handle 555(0) to the edge of the interval element 545 at the second selection handle 555(1). After creating an initial selection area 550, the end-user can drag the selection handles 555(0) or 555(1) to modify the size of the selection area 550. In response to modifications made to the selection area 550, the navigation engine 112 is configured to update the data shown in current view 220, as well as the active zoom level, in the fashion described above to display an amount of data corresponding to the selection area 550.

Figure 5F:
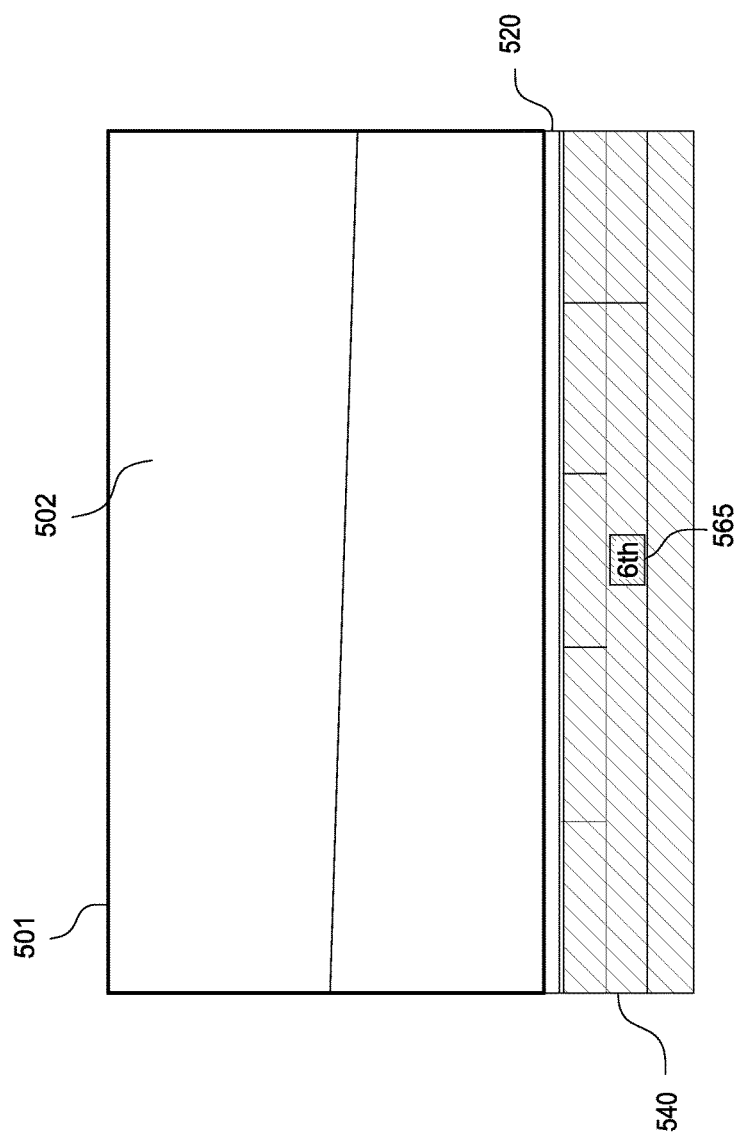

FIG. 5F shows a blur effect applied to the interactive ruler 540, according to yet another embodiment of the present invention. In operation, the data navigation engine 112 applies the blur effect to mask the interval elements 545 on the interactive rule 540. The data navigation engine 112 applies the blur effect when the end-user performs a pan operation that pans through the intervals of the dataset 195 faster than the specific intervals represented by and displayed on the interval elements 545 can be read by the end-user. Among other things, the blur effect prevents the end-user from misinterpreting the quickly changing intervals listed on the interval elements 545. In other embodiments, other obfuscatory visual effects could also be implemented instead of the blur effect discussed herein, including a fade effect, a hatching effect, and so forth. In order to show the end-user what portion of the dataset 195 is displayed with the current view 502, the data navigation engine 112 shows a heads-up display 565 that indicates the interval displayed within the current view 502 associated with the zoom level of the lowest level of granularity. For example, if the pan operation moves though the interval of the dataset 195 shown in FIG. 5C, then interval associated with the zoom level of the lowest level of granularity is the day interval of the "6th," so the data navigation engine 112 heads-up display 565 would show the "6th" in the heads-up display 565.

The embodiments illustrated in FIGS. 5A-5F are illustrative only and in no way limit the scope of the present invention. In other embodiments, various modifications of the feature and functions of the interactive ruler 540 are contemplated. For example, although row 510(1) and 510(2) represent less granular intervals than 510(0), in different embodiments, the rows 510(1) and 510(2) could represent more or less granular intervals or there may be a different number of rows 510. Further, in different embodiments, any of the rows 510 may be configured to represent the interval associated with the active zoom level. Moreover, although the dataset 195 is organized based on the interval used to record the data points 230, in different embodiments, the dataset 195 could be organized based on an interval that is different from the interval used to record the data points 230 or additional data points 230 could be extrapolated at intervals of finer granularity. In addition, although the data navigation engine 112 marks the interval element 545(1) in response to input received from the end-user, in different embodiments, the data navigation engine 112 may be configured to mark the interval element 545(1) to indicate any type of additional information related to the dataset 195, such as weekends or holidays in a temporal based dataset 195. Further, the interval element 545 may be marked with any number of colors or patterns. Also, in different embodiments the end-user can perform a zoom or pan operation with any number of I/O devices. Finally, although the data navigation engine 112 displays a current time indicator 530 for the temporal data in FIG. 5E, in different embodiments, the data navigation engine 112 may be configured to display any type of indicator related to the dataset, such as a location indicator on a map.

Figure 6B:
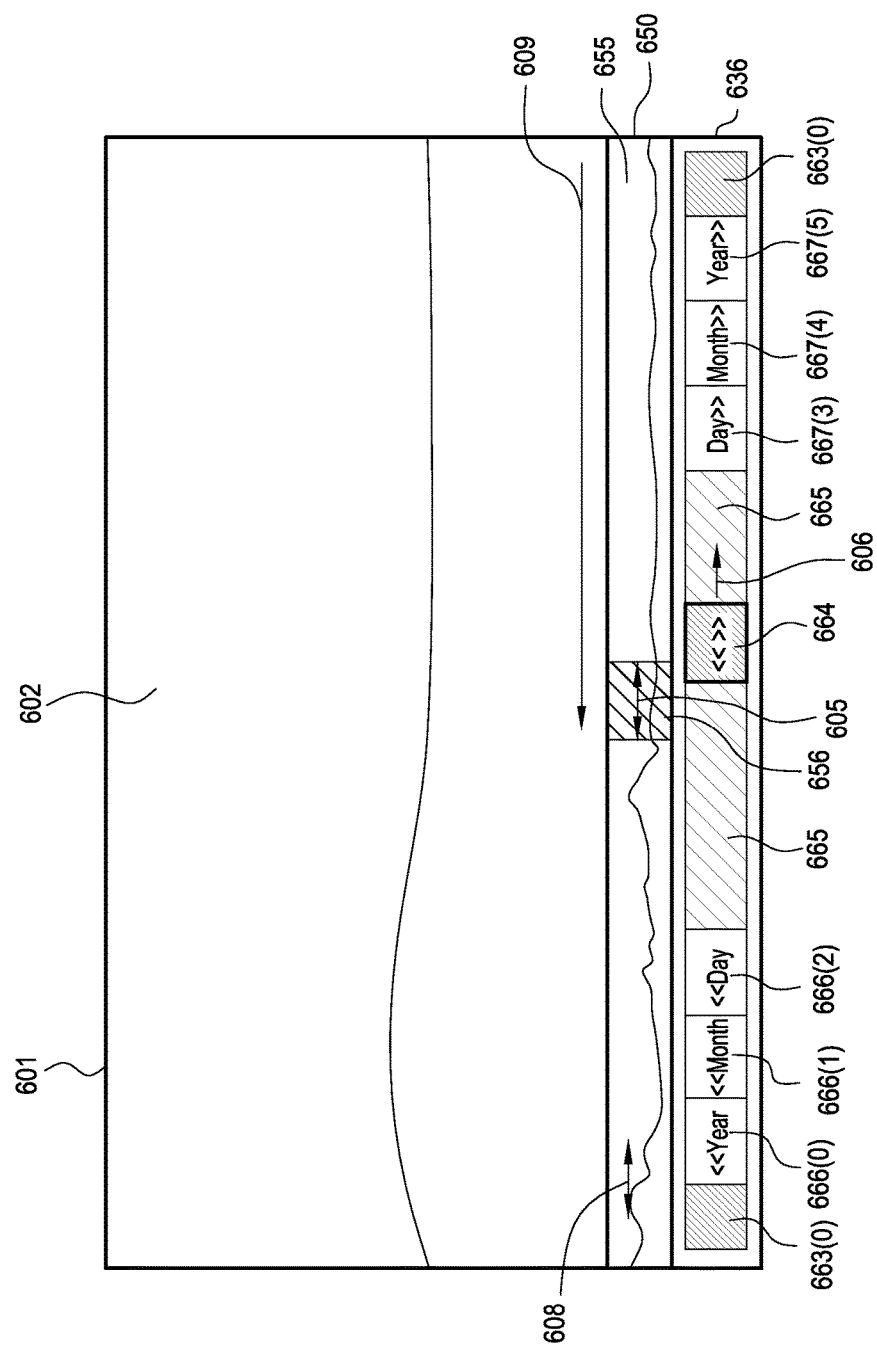

FIGS. 6A-6D illustrate a context bar 650 and a multi-scale slider 660 in conjunction with the current view 602, according to one embodiment of the present invention. As shown in FIG. 6A, the context bar 650 includes a context view 655 and a local context indicator 656. The multi-scale slider 660 includes bumpers 663, a scroll thumb 664 within a paging region 665, and stepping buttons 667.

The context view 655 displays a wider view of the dataset 195 relative to the portion of the dataset 195 displayed in the current view 602. Consequently, the context view 655 displays portions of the dataset 195 proximate to the current view 602. The portion of the dataset 195 displayed within the current view 602 is displayed in the center portion of the context view 655. The local context indicator 656 identifies this center portion of the context view 655. The portion of the dataset 195 preceding the current view 602 is displayed in the left portion of the context view 655. The portion of the dataset 195 following the current view 602 is displayed in the right portion of the context view 655. For example, the portion of the dataset 195 displayed within the context view 655 at arrow 605 may include data from the dataset 195 that is within and following the current view 602. The portion of the dataset 195 displayed within the context view 655 at arrow 608 may include data from the dataset 195 that precedes the current view 602 by a portion of the dataset 195 equivalent to a five-day interval within the dataset 195. To fit the larger portion of the dataset 195 encompassing the data of and proximate to the current view 602, the dataset 195 is displayed within the context view 655 at a higher data resolution than in the current view 602. When the end-user performs scroll operations, the data navigation engine 112 moves the portions of the dataset 195 proximate to the current view 602 through the current view 602, as described below. As the dataset 195 moves through the current view 602, the data navigation engine 112 also moves the dataset 195 through the local context indicator 656 within the context view 655.

Also shown in FIG. 6A, the multi-scale slider 660 enables the end-user to move the data proximate to the current view 602 through the current view 602. The end-user performs a pan operation or a step operation to move the proximate data into the current view 602. To perform a pan operation with the multi-scale slider 660, the end-user clicks the mouse pointer on the display surface displaying the scroll thumb 664, and then drags the mouse pointer to the right or left. In response to the end-user dragging the mouse pointer to the right or left, the data navigation engine 112 moves the scroll thumb 664 to the right, as indicated by arrow 606, or to the left, as indicated by arrow 607, within the paging region 665. The pan operation is dependent on the motion of the scroll thumb 664 across the paging region 665, not the specific location of the scroll thumb 664 within the paging region 665. The pixels of the paging region 665 and the position of the scroll thumb 664 within the paging region 665 do not map to locations within the dataset 195. Rather, the dataset 195 moves through the current view 602 from the side of the current view 602 toward which the end-user moves the scroll thumb 664. For example, if the end-user moves the scroll thumb 664 to the right, as indicated by arrow 606, then the data navigation engine 112 moves the data following the current view 602 within the current view 602. Likewise, if the end-user moves the scroll thumb 664 to the left 607, then the data navigation engine 112 moves the data preceding the current view 602 within the current view 602. In various embodiments, the pixels of the multi-scale slider 660 are not mapped to specific locations within the dataset 195, which enables this type of scrolling action. After each pan operation the data navigation engine 112 automatically returns the scroll thumb 664 to the center of the paging region 665. The pan operations are discussed in greater detail below in conjunction with FIG. 6B.

To perform a step operation with the multi-scale slider 660, the end-user can select one of the stepping buttons 667 by either clicking a mouse cursor on a particular stepping button 667 or moving the scroll thumb 664, as described above, onto a particular stepping button 667. As shown, each stepping button 667(0)-667(5) displays a particular interval commonly used to record the type of data in the dataset 195. A given interval corresponds to typical combination used to organize the data points 230 within the dataset 195. For example, stepping button 667(1) displays a "month" interval, meaning that stepping button 667(1) corresponds to monthly intervals within the dataset 195. The intervals of the stepping buttons 667 correspond to the active zoom level. The innermost stepping buttons 667(2) and 667(3) represent the interval associated with the active zoom level, which is also the largest interval that fits within the current view 602. Moving outward, the stepping buttons 667(1), 667(4), 667(0), and 667(5) represent to progressively coarser intervals. For example, the active zoom level may be associated with a day interval, so the innermost stepping buttons 667(2) and 667(3) would correspond to day intervals. The stepping buttons 667(1) and 667(4) would correspond to month intervals, and the stepping buttons 667(0) and 667(5) would correspond to year intervals. The dataset 195 moves through the current view 602 by the interval displayed on the particular stepping button 667.

The dataset 195 moves through the current view 602 from the side of the current view 602 that includes the particular stepping button 667. If the end-user clicks on the display surface displaying a stepping button 667 multiple times or holds the mouse down on the display surface displaying a stepping button 667, then the data navigation engine 112 moves the dataset 195 through the current view 602 multiple times. For example, if the end-user clicks on the stepping button 667(1) once, the data navigation engine 112 moves data corresponding to a one-month interval in the dataset 195 through the current view 602 from the left. Likewise, if the end-user clicks on the display surface displaying the stepping button 667(3) three times, the data navigation engine 112 moves data corresponding to three day intervals in the dataset 195 through the current view 602 from the right. The step operations are discussed in greater detail below in conjunction with FIG. 6C.

As also shown in FIG. 6A, the size of the scroll thumb 664 in relation to the size of the paging region 665 visually indicates the size of the active zoom level in relation to the size of the entire dataset 195. In certain embodiments, the scroll thumb 664 remains the same size, as the end-user performs zoom-in or zoom-out operations within the current view 602. Therefore, the data navigation engine 112 expands or contracts the width of the paging region 665 to maintain the ratio of the size of the active zoom level relative to the size of the entire dataset 195. The data navigation engine 112 displays bumpers 663 on the edges of the multi-scale zoom slider 660 to restrict the size of the paging region 665. If the data navigation engine 112 contracts the bumpers 663 to use less space of the multi-scale zoom slider 660, the paging region 665 expands. Likewise, if the data navigation engine 112 expands the bumpers 663 to fill in more space of the multi-scale zoom slider 660, the paging region 665 contracts. In various embodiments, the end-user does not interact with the bumpers 663. Further, when the end-user performs zoom-in or zoom-out operations within the current view 602, the active zoom level changes, so the interval associated with the active zoom level may change. In response to a change in the interval associated with the active zoom level, the data navigation engine 112 adds or removes the innermost stepping buttons 667(2) and 667(3). Thus, the innermost stepping buttons 667(2) and 667(3) continually correspond to the interval associated with the active zoom level. When the active zoom level corresponds to the entire dataset 195, so that the entire dataset 195 is displayed within the current view 602, the data navigation engine 112 removes all the stepping buttons 667 and expands the bumpers 663 expand from the edges of the multi-scale slider 660 to the scroll thumb 664, which contracts the paging region 665 to the size of the scroll thumb 664. The effect of zoom-in and zoom-out operations are discussed in greater detail below in conjunction with FIG. 6D.

As shown in FIG. 6B, to perform a pan operation through the portion of the dataset 195 mapped to the right of the current view 602, the end-user clicks the mouse pointer on the scroll thumb 664, and then drags the mouse pointer to the right side of the paging region 665. In response, the data navigation engine 112 moves the dataset 195 to the left within the current view 602, so that data immediately to the right of the current view 602 moves within and potentially through the current view 602. The flow of data within the current view 602 during the above pan operation is shown by arrow 609. The data navigation engine 112 also moves the dataset 195 to the left within the context view 655, so that the portion of the dataset 195 within the local context indicator 656 continues to match the portion of the dataset 195 displayed in the current view 602. Specifically, the data navigation engine 112 moves the portion of the dataset 195 that matches the current view 602 within the local context indicator 656, as displayed by arrow 605.

Figure 6C:
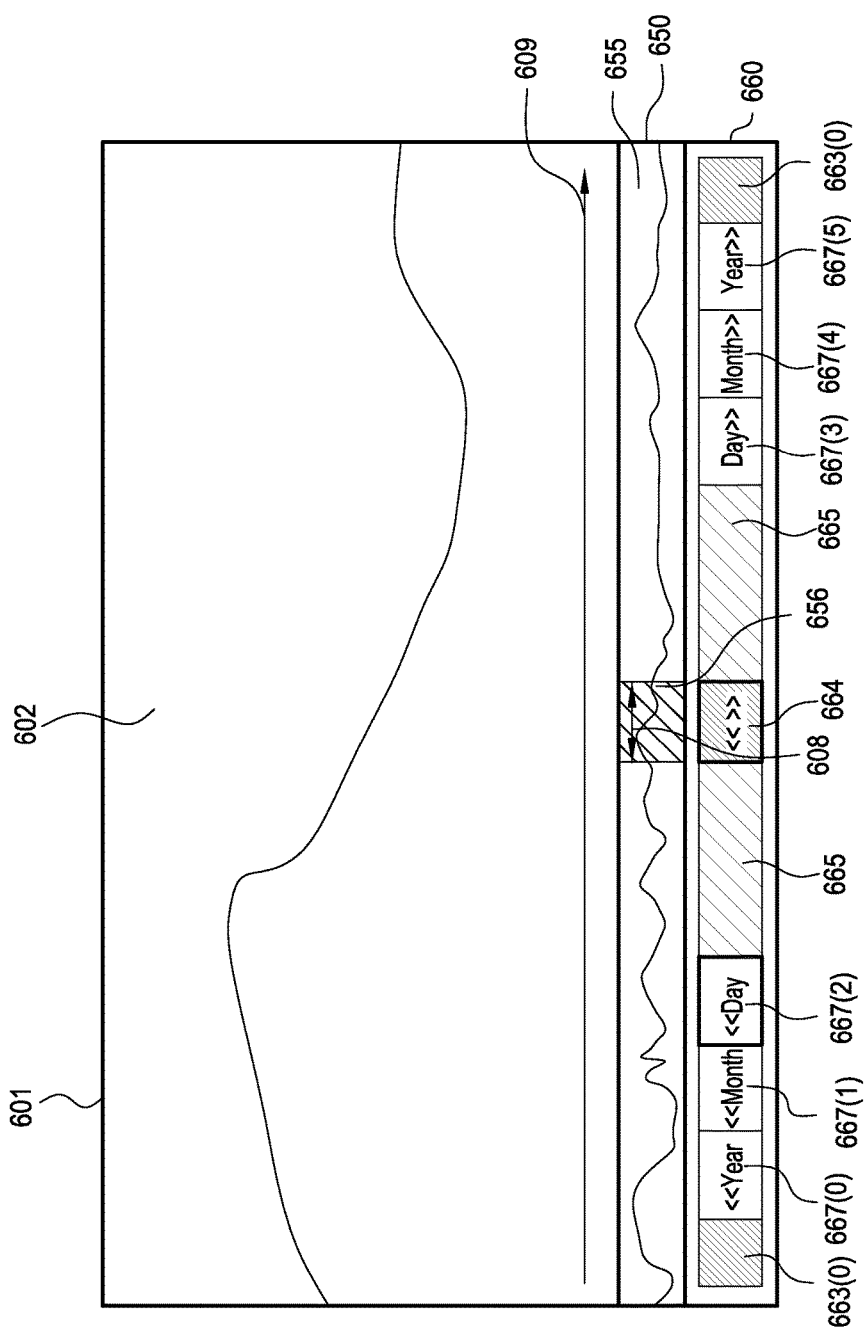

As shown in FIG. 6C, to perform a step operation to move the dataset 195 through the current view 602 in one-day intervals, the end-user selects the stepping button 667(2). To move data corresponding to a five-day interval in the dataset 195 through the current view 602, the end-user clicks a mouse cursor within the display surface displaying the stepping button 667(2) five times. In response, the data navigation engine 112 moves the dataset 195 to the right through the current view 602 as indicated by arrow 609. The data navigation engine 112 moves the portion of the dataset 195 preceding the current view 602 by five-day intervals within the current view 602. The size of the portion of the dataset 195 within the current view 602 remains constant, but the data navigation engine 112 moves the dataset 195 by exactly five-day intervals within the current view 602. Likewise, the data navigation engine 112 moves the preceding portion of the dataset 195 within the context view 655, shown as arrow 608, to the right by a five-day interval to ensure that the portion of the dataset 195 within the local context indicator 656 matches the portion of the dataset 195 within the current view 602.

Figure 6D:
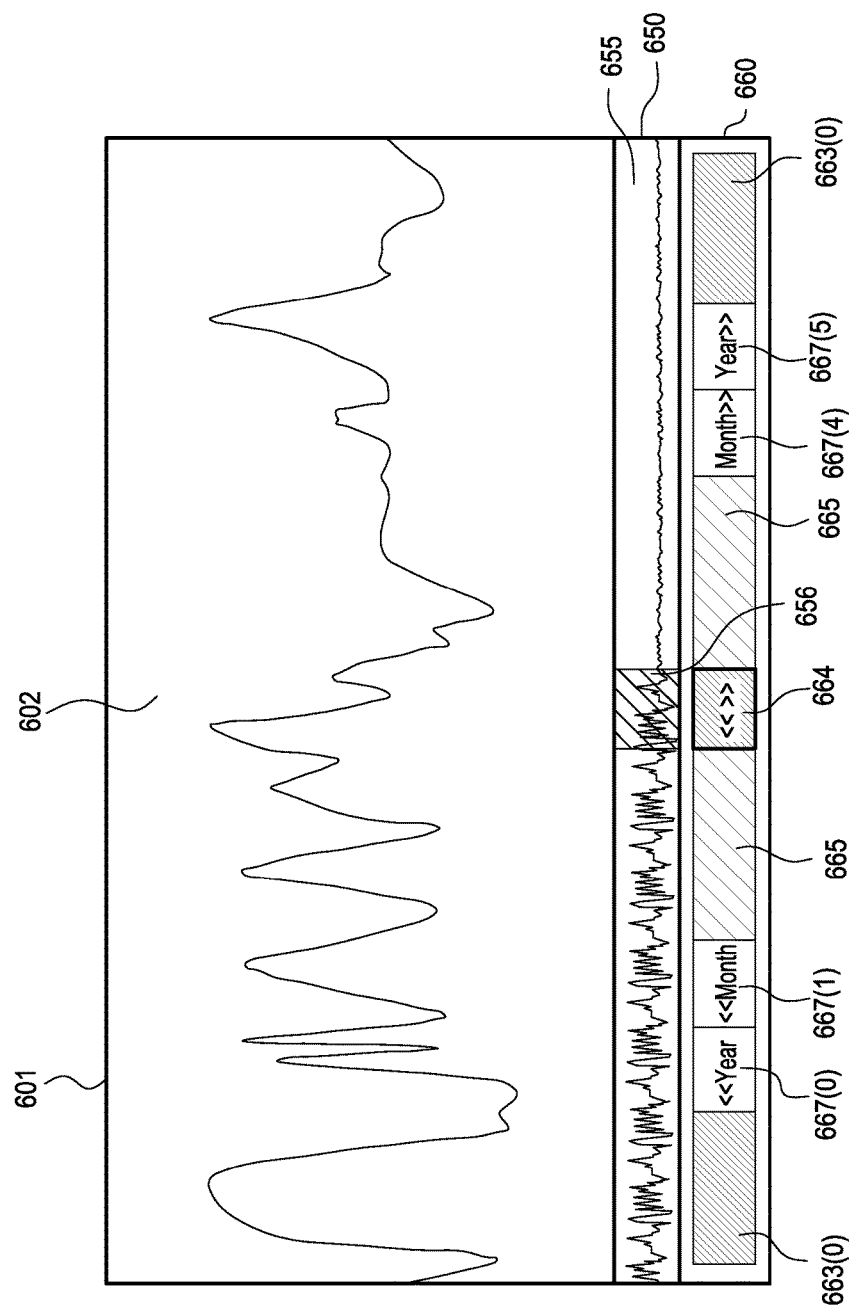

As shown in FIG. 6D, the multi-scale slider 660 is configured to update the size of the paging region 665, as well as remove the innermost stepping buttons 667(2) and 667(3) when the end-user performs a zoom-out operation within the current view 220. In response to the zoom-out operation, the data navigation engine 112 changes the active zoom level to a zoom level corresponding with a larger portion of the dataset 195. Thus, the size of the active zoom level relative to the size of the entire dataset 195 expands. As discussed above, the size of the scroll thumb 664 in relation to the size of the paging region 665 visually indicates the size of the active zoom level in relation to the size of the entire dataset 195. To maintain this indication, the data navigation engine 112 expands the bumpers 663(0) and 663(1) to fill in a larger portion of the space of the multi-scale slider 660. As the data navigation engine 112 expands the bumpers 663(0) and 663(1) horizontally, the paging region 665 contracts, making the scroll thumb 664 cover a larger portion of the paging region 665, just as the size of the active zoom level becomes a larger portion of the entire dataset 195. The data navigation engine 112 identifies the interval associated with the new active zoom level as a month interval. Therefore, the data navigation engine 112 removes the innermost stepping buttons 667, until the remaining innermost stepping buttons 667(1) and 667(4) correspond to the interval associated with the active zoom level within the current view 602.

Figure 7:
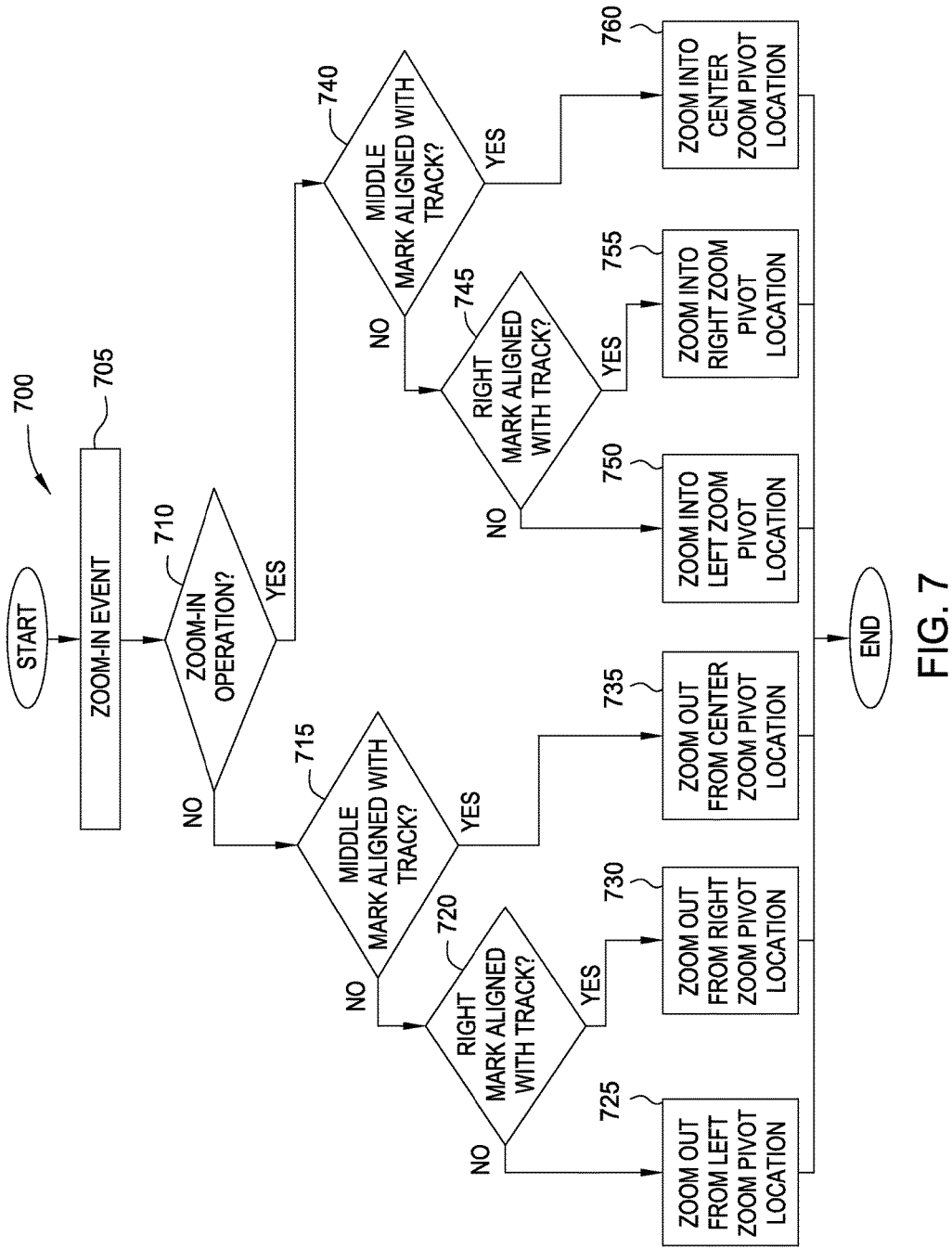
FIG. 7 sets forth a flow diagram of method steps for changing the data resolution of a current view of a dataset in response to a zoom event received from a pivot control zoom slider, according to one embodiment of the present invention.

FIG. 7 sets forth a flow diagram of method steps for changing the data resolution of a current view of a dataset in response to a zoom event received from a pivot control zoom slider, according to one embodiment of the present invention. Although the method steps are described in conjunction with the systems of FIGS. 1-4C, persons skilled in the art will understand that any system configured to perform the method steps, in any order, is within the scope of the present invention.

As shown, a method 700 begins at step 705, where the data navigation engine 112 of FIG. 1 receives a zoom event from the pivot control zoom slider 330 of FIG. 3. The data navigation engine 112 may receive the zoom event via the GUI 300, which could, for example, be generated by the data visualizer 110 of FIG. 1. The end-user may specify a zoom operation using the step-in button 405, step-out button 408, or the handle 410 of the pivot control zoom slider 330.

At step 710, the data navigation engine 112 determines whether the zoom event is a zoom-in operation or a zoom-out operation. The end-user could specify a zoom-in operation using the step-in button 405 or by moving the handle 410 upwards along the track 415 of the pivot control zoom slider 330. Likewise, the end-user could specify a zoom-out operation using the step-out button 408 or moving the handle 410 downwards along the track 415. If the data navigation engine 112 determines that the zoom event is a zoom-out operation, then the method 700 proceeds to step 715.

At step 715, the data navigation engine 112 determines whether the middle mark 420(1) of the handle 410 is aligned with the track 415. The end-user could, for example, specify a zoom pivot location 440 by aligning one of the marks 420(0)-420(2) with the track 415. If the data navigation engine 112 determines that the middle mark 420(1) of the handle 410 is aligned with the track 415, then the data navigation engine 112 understands that the end-user has, at some point, selected the middle zoom pivot location 440(1) within the current view 220, and method 700 proceeds to step 735.

At step 735, the data navigation engine 112 performs a zoom-out operation with respect to the center zoom pivot location 440(1) within the current view 220. The data navigation engine 112 changes the active zoom level to a zoom level that represents more data points 230 without panning the dataset 195. The method 700 then ends.

Returning now to step 715, if the data navigation engine 112 determines that mark 420(1) is not aligned with the track 415, then the data navigation engine 112 understands that the end-user has selected, at some point, either zoom pivot location 440(0) or zoom pivot location 440(2), and the method proceeds to step 720. At step 720, the data navigation engine 112 determines whether the right mark 420(2) of the handle 410 is aligned with the track 415. If the data navigation engine 112 determines that the right mark 420(2) of the handle 410 is aligned with the track 415, then data navigation engine 112 understands that the end-user, at some point, has selected the right zoom pivot location 440(2), and method 700 proceeds to step 730. At step 730, the data navigation engine 112 performs a zoom-out operation with respect to the right zoom pivot location 440(2). The data navigation engine 112 automatically pans the dataset 195 to the right while changing the active zoom level to a zoom level that represents more data points 230. The method 700 then ends.

If at step 720, the data navigation engine 112 determines that the right mark 420(2) is not aligned with the track 415, then the data navigation engine 112 understands that the end-user, at some point, has selected the left zoom pivot location 440(0), and the method 700 proceeds to step 725. At step 725, the data navigation engine 112 performs a zoom-out operation with respect to the left zoom pivot location 440(0). The data navigation engine 112 automatically pans the dataset 195 to the left while changing the active zoom level to a zoom level that represents more data points 230. The method 700 then ends.

Returning now to step 710, if the data navigation engine 112 determines that the zoom event is a zoom-in operation, then the method 700 proceeds to step 740. At step 740, the data navigation engine 112 determines whether middle mark 420(1) of the handle 410 is aligned with the track 415. If the data navigation engine 112 determines that the middle mark 420(1) of the handle 410 is aligned with the track 415, then the data navigation engine 112 understands that the end-user has, at some point, selected the middle zoom pivot location 440(1) within the current view 220, and method 700 proceeds to step 760.

At step 760, the data navigation engine 112 performs a zoom-in operation with respect to the center zoom pivot location 440(1) within the current view 220. The data navigation engine 112 changes the active zoom level to a zoom level that represents fewer data points 230. The method 700 then ends.

Returning now to step 740, if the data navigation engine 112 determines that mark 420(1) is not aligned with the track 415, then the data navigation engine 112 understands that the end-user has selected, at some point, either zoom pivot location 440(0) or zoom pivot location 440(2), and the method proceeds to step 745. At step 745, the data navigation engine 112 determines whether the right mark 420(2) of the handle 410 is aligned with the track 415. If the data navigation engine 112 determines that the right mark 420(2) of the handle 410 is aligned with the track 415, then data navigation engine 112 understands that the end-user, at some point, has selected the right zoom pivot location 440(2), and method 700 proceeds to step 755. At step 755, the data navigation engine 112 performs a zoom-in operation with respect to the right zoom pivot location 440(2). The data navigation engine 112 automatically pans the dataset 195 to the left while changing the active zoom level to a zoom level that represents fewer data points 230. The method 700 then ends.

If at step 745, the data navigation engine 112 determines that the right mark 420(2) is not aligned with the track 415, then the data navigation engine 112 understands that the end-user, at some point, has selected the left zoom pivot location 440(0), and the method 700 proceeds to step 750. At step 750, the data navigation engine 112 performs a zoom-in operation with respect to the left zoom pivot location 440(0). The data navigation engine 112 automatically pans the dataset 195 to the right while changing the active zoom level to a zoom level that represents fewer data points 230. The method 700 then ends.

Persons skilled in the art will recognize that the method 700 described above represents just one possible embodiment of the pivot control zoom slider 330, and that other embodiments are also possible. For example, the pivot control zoom slider 330 could include handle 410 with arbitrarily placed marks that would allow the end-user to slide the handle 410 during the zoom operation to dynamically select any zoom pivot location. The navigation engine 112 could detect that arbitrary zoom pivot location and adjust the zooming operation dynamically, thereby updating the current view 220 to zoom into the dynamically selected, arbitrary zoom pivot location.

Figure 8:
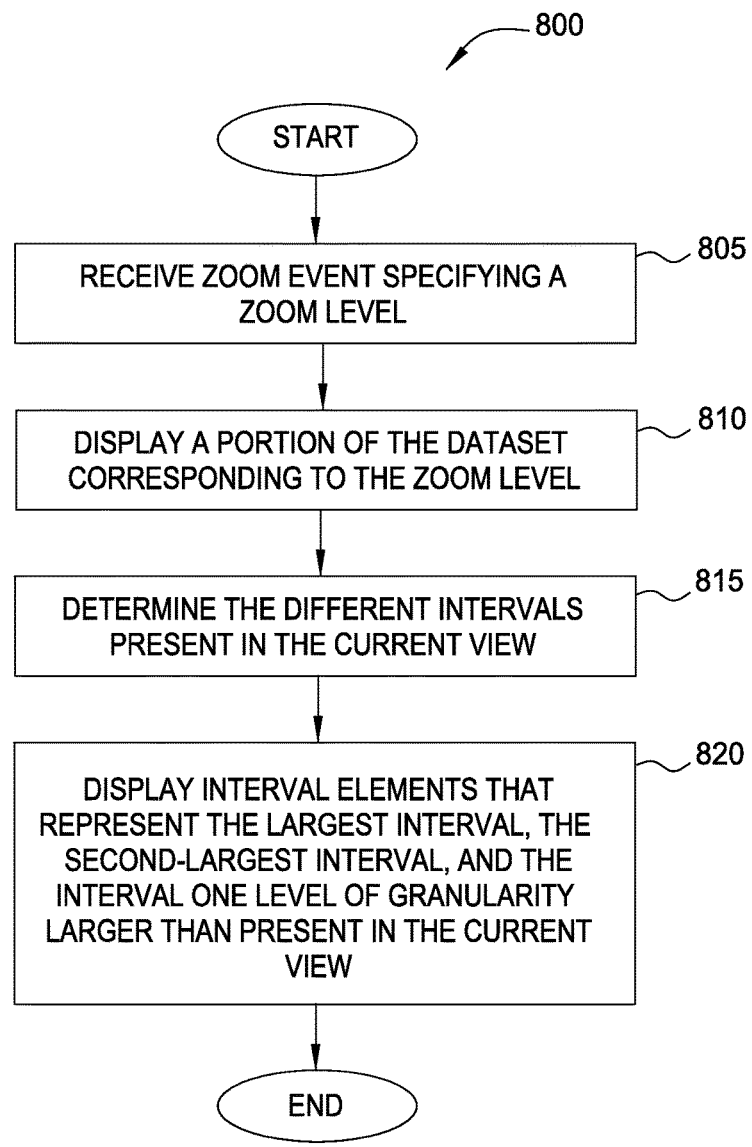
FIG. 8 sets forth a flow diagram of method steps for updating an interactive ruler in response to a zoom event, according to one embodiment of the present invention.

FIG. 8 sets forth a flow diagram of method steps for updating an interactive ruler in response to a zoom event, according to one embodiment of the present invention. Although the method steps are described in conjunction with the systems of FIGS. 1-3 and 5A-5F, persons skilled in the art will understand that any system configured to perform the method steps, in any order, is within the scope of the present invention.

As shown, a method 800 begins at step 805, where the data navigation engine 112 of FIG. 1 receives a zoom event specifying a zoom level from the interactive ruler 540 of FIG. 5. The data navigation engine 112 may receive the zoom event via the GUI 300, which could, for example, be generated by the data visualizer 110 of FIG. 1. The end-user may specify a zoom operation using the interval elements 545 of the interactive ruler. The zoom event may be a zoom-in event, which would specify a zoom level corresponding to fewer data points 230 than represented in the current view 502. Otherwise, the zoom event may be a zoom-out event, which would specify a zoom level corresponding to more data points 230 than represented in the current view 502.

At step 810, the data navigation engine 112 displays a portion of the dataset 195 corresponding to the new zoom level. The data navigation engine 112 sets the active zoom level to the new zoom level. If the new zoom level represents fewer data points 230 than represented in the current view 502 with the previous zoom level, then the data navigation engine 112 decreases the portion of the dataset 195 displayed in the current view 502. If the new zoom level represents more data points 230 than represented in the current view 502 with the previous zoom level, then the data navigation engine 112 increases the portion of the dataset 195 displayed in the current view 502.

At step 815, the data navigation engine 112 determines the different intervals present in the current view 502, as determined by the active zoom level. Specifically, the data navigation engine 112 identifies the largest interval that fits within the current view 220 as the interval associated with the active zoom level. The data navigation engine 112 also identifies the interval one level of granularity larger, which would include the number of data points 230 represented in the current view 220, and the second-largest interval, which would fit within the current view 220 multiple times.

At step 820, the data navigation engine 112 displays the rows 510 with interval elements 545 that represent the identified intervals. The data navigation engine 112 displays interval elements 545 that represent the largest interval that fits within the current view 220 in row 510(1). This is the interval associated with the active zoom level. The data navigation engine 112 also displays interval elements that represent a portion of the interval one level of granularity larger in row 510(2), and interval elements that represent the second-largest interval in row 510(0). The method 800 then ends.

Figure 9A:
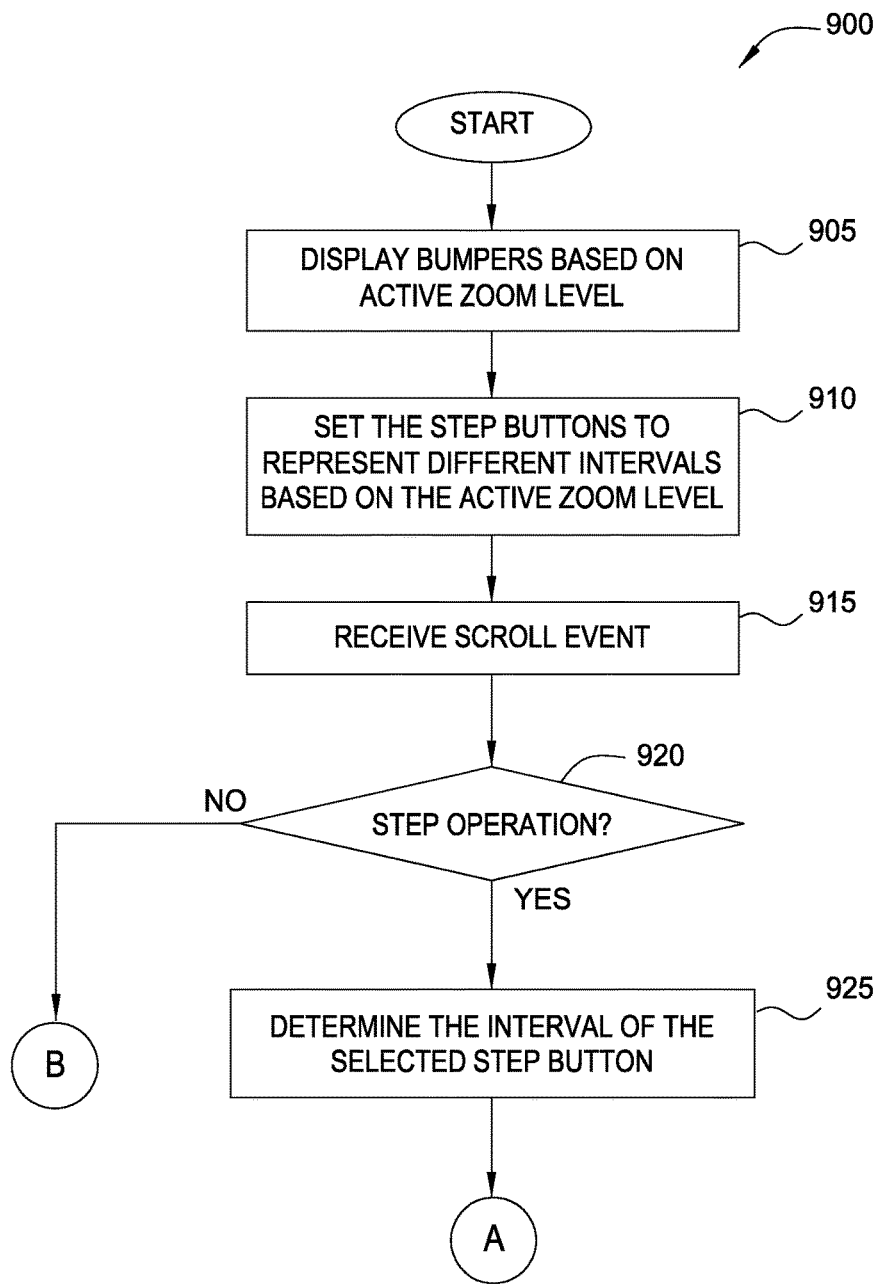
FIGS. 9A-9C set forth a flow diagram of method steps for repositioning a current view of a dataset in response to a scroll event, according to one embodiment of the present invention.
Figure 9B:
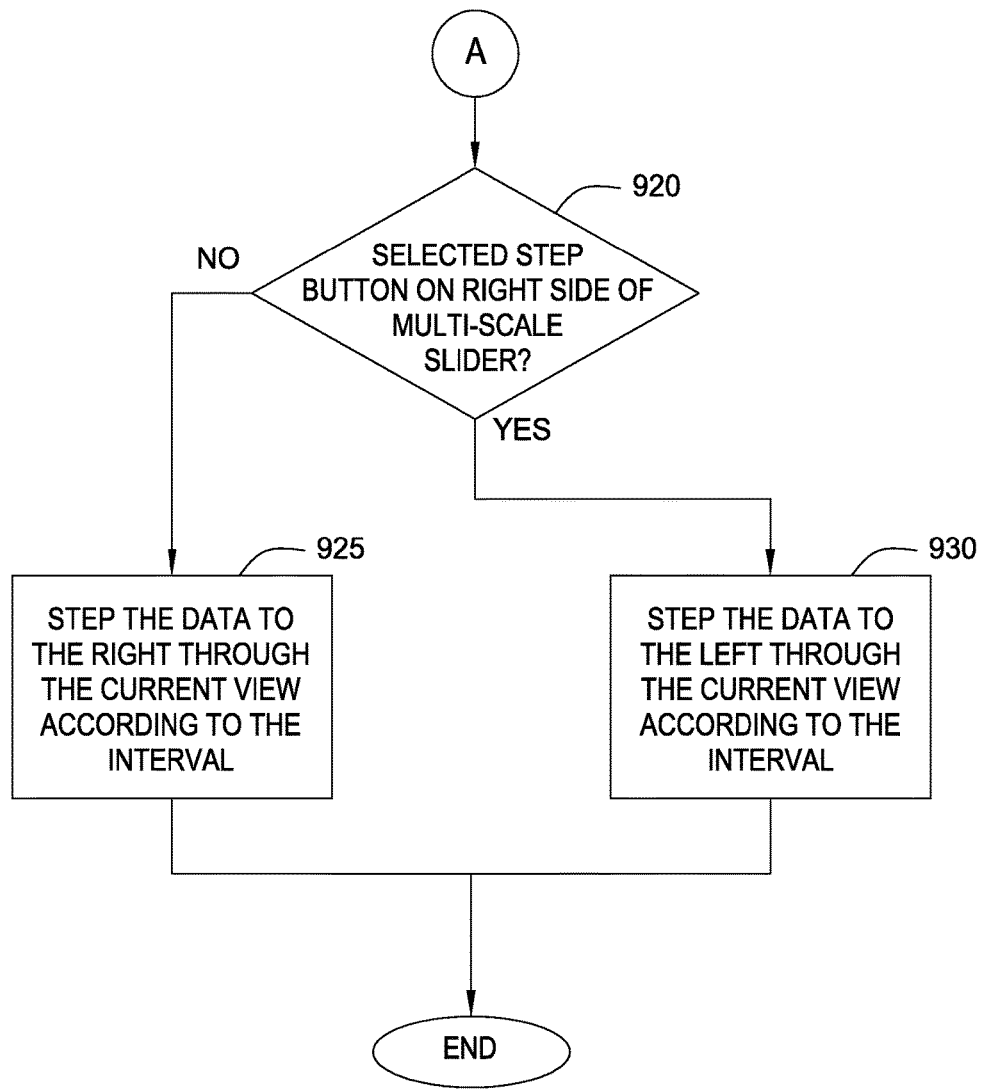
Figure 9C:
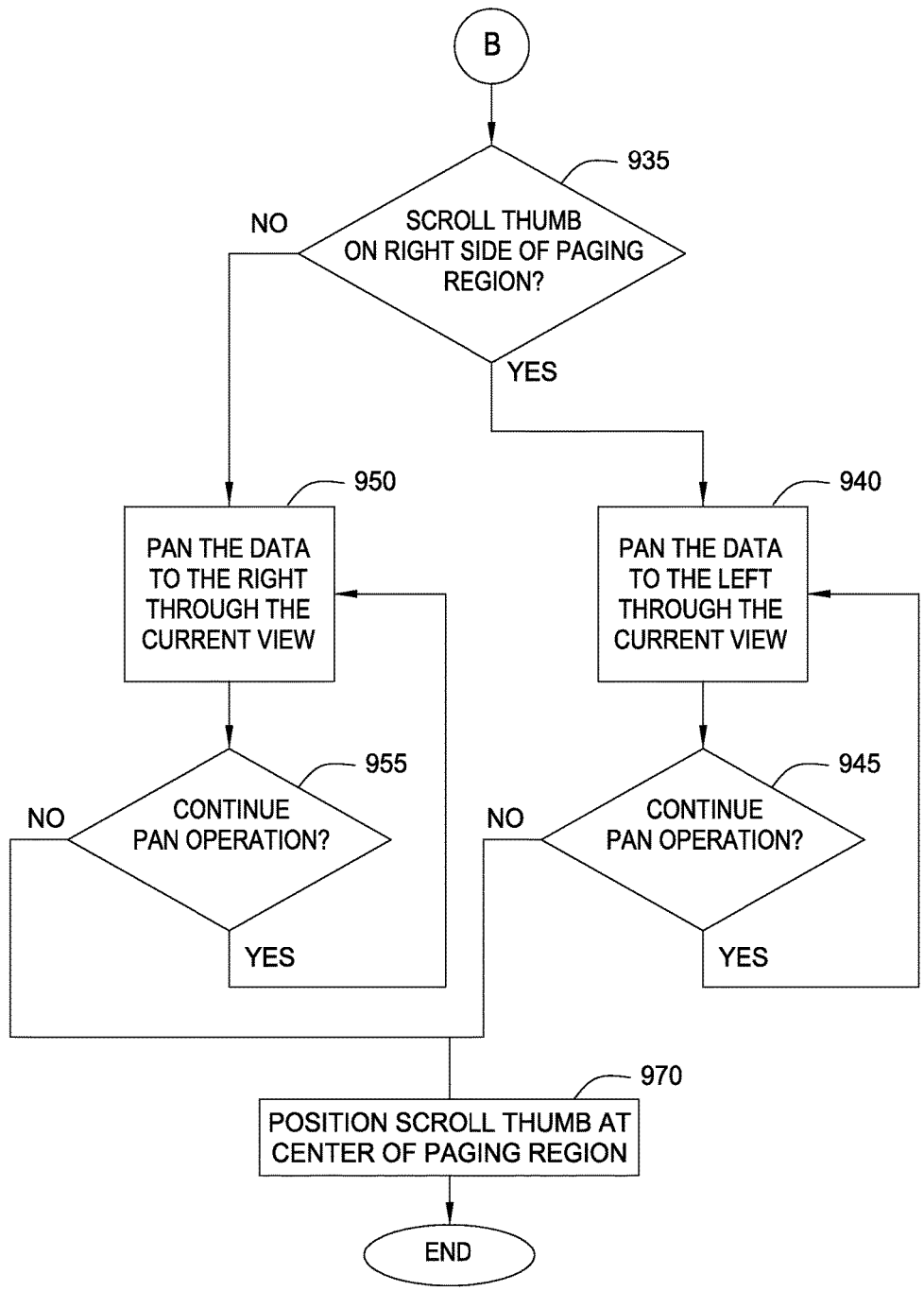

FIGS. 9A-9C set forth a flow diagram of method steps for repositioning a current view of a dataset in response to a scroll event, according to one embodiment of the present invention. Although the method steps are described in conjunction with the systems of FIGS. 1-3 and 6A-6F, persons skilled in the art will understand that any system configured to perform the method steps, in any order, is within the scope of the present invention.

As shown, a method 900 begins at step 905, where the data navigation engine 112 of FIG. 1 displays bumpers 663 based on the active zoom level. The active zoom level corresponds to the number of data points 630 represented in the current view 602. The size of the scroll thumb 664 in relation to the size of the paging region 665 visually indicates the size of the active zoom level in relation to the size of the entire dataset 195. The data navigation engine 112 restricts the size of the paging region 665 with bumpers 663 displayed on the edges of the multi-scale zoom slider 660. The data navigation engine 112 visually indicates that the data points corresponding to the active zoom level are a small portion of the dataset 195, by displaying bumpers 663 that cover a small portion of the multi-scale zoom slider 660. Likewise, the data navigation engine 112 visually indicates that the data points corresponding to the active zoom level are a large portion of the dataset 195, by displaying bumpers 663 that cover a large portion of the multi-scale zoom slider 660.

At step 910, the data navigation engine 112 sets the step buttons to represent different intervals based on the active zoom level. The intervals of the stepping buttons 667 correspond to the active zoom level. The intervals of the stepping buttons 667 also correspond to the size of the dataset 195. The innermost stepping buttons 667 could represent the interval associated with the active zoom level, which is also the largest interval that fits within the current view 602. Moving outward, the stepping buttons 667 could represent progressively coarser intervals, up to the largest interval that fits within the dataset 195. The data navigation engine 112 could also display no stepping buttons 667. If the active zoom level corresponds to the entire dataset 195, so that the largest interval that fits in the active view is the largest interval that fits in the dataset, then there could be no portion of the dataset 195 outside of the current view 602, so the data navigation engine 112 could display no stepping buttons 667.

At step 915, the data navigation engine 112 receives a scroll event from the multi-scale slider 660 of FIG. 6. The data navigation engine 112 may receive the scroll event via the GUI 300, which could, for example, be generated by the data visualizer 110 of FIG. 1. The end-user may specify a pan operation using the scroll thumb 664 or a step operation using the stepping buttons 667 of the multi-scale slider 660.

At step 920, the data navigation engine 112 determines whether the scroll event is a pan operation or a step operation. The end-user could specify a pan operation by clicking a mouse pointer on the scroll thumb 664 and moving the scroll thumb 664 horizontally across the paging region 665 of the multi-scale slider 660. Likewise, the end-user could specify a step operation by selecting one of the stepping buttons 667. The end-user could select a stepping buttons 667 by clicking a mouse pointer on one of the stepping buttons 667 or moving the scroll thumb 664 over one of the stepping buttons 667. If the data navigation engine 112 determines that the scroll event is a step operation, then the method 900 proceeds to step 925.

At step 925, the data navigation engine 112 determines the interval represented by the selected stepping button 667. Each stepping button 667 represents a particular interval. If the data navigation engine 112 determines that a mouse click has occurred on a stepping button 667 or that the scroll thumb 664 is positioned over a stepping button 667, then the data navigation engine 112 understands that the end-user has selected the stepping button 667 with a particular interval, and method 900 proceeds to step 930.

At step 930, the data navigation engine 112 determines whether the step operation is in the left or right direction. Each stepping button 667 is located at the left or right side the multi-scale slider 660. If the data navigation engine 112 determines that the selected stepping button 667 is on the right side of the multi-scale slider 660, then the data navigation engine 112 understands that the end-user has selected a stepping button 667 for stepping to the right of the current view 602, and method 900 proceeds to step 940.

At step 940, the data navigation engine 112 steps the dataset 195 to the left through the current view 602 by the particular interval. A given interval corresponds to a particular number of data points 230 in the dataset 195. The data navigation engine 112 moves the particular number of data points 230 to the left through the current view 602. Moving the dataset 195 to the left brings the data to the right of the current view 602 into the current view 602. If the step operation is in response to the end-user moving the scroll thumb 664 over the selected stepping button, then the data navigation engine 112 may reposition the scroll thumb at the center of the paging region 665. The method 900 then ends.

Returning now to step 930, if the data navigation engine 112 determines that the selected stepping button 667 is not on the right side of the multi-scale slider 660, then the data navigation engine 112 understands that the end-user has selected a stepping button 667 for stepping to the left of the current view 602, and the method proceeds to step 935. At step 935, the data navigation engine 112 steps the dataset 195 to the right through the current view 602 by the particular interval. The data navigation engine 112 moves the particular number of data points 230 corresponding to the particular interval in the dataset 195 to the right through the current view 602. Moving the dataset 195 to the right brings the data to the left of the current view 602 into the current view 602. If the step operation is in response to the end-user moving the scroll thumb 664 over the selected stepping button, then the data navigation engine 112 may reposition the scroll thumb at the center of the paging region 665. The method 900 then ends.

Returning now to step 920, if the data navigation engine 112 determines that the scroll event is not a step operation, then the data navigation engine 112 understands that the end-user has moved the scroll thumb 664 horizontally across the paging region 665 of the multi-scale slider 660, and the method 900 proceeds to step 945. At step 945, the data navigation engine 112 determines the direction of the pan operation. The scroll thumb 664 may be moved to the left or right within the paging region 665. If the data navigation engine 112 determines that the scroll thumb 664 is on the right side of the paging region 665, then the data navigation engine 112 understands that the end-user has selected to pan to the right of the current view 602, and method 900 proceeds to step 950.

At step 950, the data navigation engine pans the dataset 195 to the left through the current view 602. In response, the data navigation engine 112 moves the dataset 195 to the left through the current view 602. Moving the dataset 195 to the left brings the data to the right of the current view 602 into the current view 602. Method 900 proceeds to step 955.

At step 955, the data navigation engine 112 determines whether to continue the pan operation. If the data navigation engine 112 determines that the mouse pointer is still holding the scroll thumb 664, then the data navigation engine 112 understands that the end-user has continued the pan operation, and the method 900 returns to step 950. Otherwise, if the data navigation engine 112 determines that the mouse pointer has released the scroll thumb 664, then the data navigation engine 112 understands that the end-user has completed the pan operation, and the method 900 proceed to step 970.

At step 970, the data navigation engine 112 positions the scroll thumb at the center of the paging region 665. The method 900 then ends.

Returning to step 945, ff the data navigation engine 112 determines that the scroll thumb 664 is not on the right side of the paging region 665, then the data navigation engine 112 understands that the end-user has selected to pan to the left of the current view 602, and method 900 proceeds to step 960. At step 960, the data navigation engine 112 pans the dataset 195 to the right through the current view 602. The data navigation engine 112 moves the dataset 195 to the right through the current view 602. Moving the dataset 195 to the right brings the data to the left of the current view 602 into the current view 602. Method 900 proceeds to step 965.

At step 965, the data navigation engine 112 determines whether to continue the pan operation. If the data navigation engine 112 determines that the mouse pointer is still holding the scroll thumb 664, then the data navigation engine 112 understands that the end-user has continued the pan operation, and the method 900 returns to step 960. Otherwise, if the data navigation engine 112 determines that the mouse pointer has released the scroll thumb 664, then the data navigation engine 112 understands that the end-user has completed the pan operation, and the method 900 proceeds to step 970. At step 970, the data navigation engine 112 positions the scroll thumb at the center of the paging region 665. The method 900 then ends.

In sum, the techniques disclosed above provide user interface navigation elements for navigating large and expanding datasets, including a pivot control zoom slider for adjusting the active zoom level in a targeted manner, an interactive ruler for consistent visual feedback and navigation based upon intervals of the dataset, a context bar for viewing the data proximate to the current view, and a multi-scale slider for repositioning the dataset within the current view. The pivot control zoom slider control provides a handle that an user may shift orthogonally to the track of the pivot control zoom slider to control the location of the zoom pivot location and therefore control the portion of the current view that the end-user zooms in or out from. The interactive ruler provides a fixed number of rows arranged to represent different intervals of the dataset. As the active zoom level changes, the interval elements of the rows, that represent the intervals within the current view expand and contract horizontally. This continues until the active zoom level associates with a different interval. The rows then represent different intervals. Furthermore, the interval elements of each zoom level are interactive, so the end-user can navigate by clicking on the desired interval element. The context bar displays the data proximate to the current view.

The multi-scale slider provides a scroll thumb for navigating the current view through the surrounding data and multiple stepping regions that reposition the current view by specific units of measure.

These user interface navigation elements may be used individually or concurrently to more efficiently navigate large and expanding datasets.

Advantageously, the user interface navigation elements provide the end-user with consistent control and visual feedback while navigating the dataset, independent of the size of the dataset or the portion of the dataset displayed within the current view. Therefore, large and expanding datasets can be navigated more effectively relative to prior art approaches.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of the present invention is determined by the claims that follow.

What is claimed is:

1. A method for navigating data included in a data set, the method comprising:
    displaying a plurality of discrete zoom pivot locations within a current view of the data set, each discrete zoom pivot location corresponding to a different zoom pivot location associated with a zoom operation;
    displaying a slider element for selecting a particular discrete zoom pivot location within the plurality of discrete zoom pivot locations, the slider element displaying a plurality of discrete indicators that map to the plurality of discrete zoom pivot locations displayed within the current view of the data set;
    receiving a request to perform the zoom operation;
    determining a zoom pivot location associated with the zoom operation;
    and
    performing the zoom operation relative to the zoom pivot location.

2. The method of claim 1, wherein the zoom operation comprises a zoom-in operation, and the zoom pivot location is disposed substantially in the middle of the current view of the data set.

3. The method of claim 1, wherein the zoom operation comprises a zoom-in operation, and the zoom pivot location is disposed on the right side of the current view of the data set.

4. The method of claim 1, wherein the zoom operation comprises a zoom-in operation, and the zoom pivot location is disposed on the left side of the current view of the data set.

5. The method of claim 1, wherein the zoom operation comprises a zoom-out operation, and the zoom pivot location is disposed substantially in the middle of the current view of the data set.

6. The method of claim 1, wherein the zoom operation comprises a zoom-out operation, and the zoom pivot location is disposed on the right side of the current view of the data set.

7. The method claim 1, wherein the zoom operation comprises a zoom-out operation, and the zoom pivot location is disposed on the left side of the current view of the data set.

8. The method of claim 1, further comprising receiving user input via either a slider element or a button element within a graphical user interface to effect the zoom operation.

9. The method of claim 8, further comprising receiving user input via the slider element to effect selecting the zoom pivot location, wherein the zoom pivot location is disposed at an arbitrary location of the current view of the data set.

10. The method of claim 9, wherein the slider element is configured to move in a first direction within the graphical user interface to effect the zoom operation and in a second direction within the graphical user interface to effect selecting the zoom pivot location, wherein the first direction is substantially orthogonal to the second direction.

11. The method of claim 1, wherein:
    the data set is displayed in a viewport of a user interface; and
    the zoom pivot location comprises a point in the viewport from which the current view of the data set zooms-in or zooms-out.

12. The method of claim 1, wherein performing the zoom operation relative to the zoom pivot location comprises displaying the data set surrounding the zoom pivot location in the current view.

13. The method of claim 1, further comprising displaying a plurality of selectable zoom pivot locations within the current view of the data set, each selectable zoom pivot location corresponding to a different zoom pivot location associated with the zoom operation.

14. The method of claim 13, wherein the plurality of selectable zoom pivot locations are displayed on a left side, right side, and middle of the current view of the data set.

15. A non-transitory computer-readable medium including instructions that, when executed by a processing unit, cause the processing unit to navigate data included in a data set, by performing the steps of:
    displaying a plurality of discrete zoom pivot locations within a current view of the data set, each discrete zoom pivot location corresponding to a different zoom pivot location associated with a zoom operation;
    displaying a slider element for selecting a particular discrete zoom pivot location within the plurality of discrete zoom pivot locations, the slider element displaying a plurality of discrete indicators that map to the plurality of discrete zoom pivot locations displayed within the current view of the data set;
    receiving a request to perform the zoom operation;

determining a zoom pivot location associated with the zoom operation;
and
performing the zoom operation relative to the zoom pivot location.

16. The computer-readable medium of claim 15, wherein the zoom operation comprises a zoom-in operation, and the zoom pivot location is disposed substantially in the middle of the current view of the data set.

17. The computer-readable medium of claim 15, wherein the zoom operation comprises a zoom-in operation, and the zoom pivot location is disposed on the right side of the current view of the data set.

18. The computer-readable medium of claim 15, wherein the zoom operation comprises a zoom-in operation, and the zoom pivot location is disposed on the left side of the current view of the data set.

19. The computer-readable medium of claim 15, wherein the zoom operation comprises a zoom-out operation, and the zoom pivot location is disposed substantially in the middle of the current view of the data set.

20. The computer-readable medium of claim 15, wherein the zoom operation comprises a zoom-out operation, and the zoom pivot location is disposed on the right side of the current view of the data set.

21. The computer-readable medium claim 15, wherein the zoom operation comprises a zoom-out operation, and the zoom pivot location is disposed on the left side of the current view of the data set.

22. The computer-readable medium of claim 15, further comprising receiving user input via either a slider element or a button element within a graphical user interface to effect the zoom operation.

23. The computer-readable medium of claim 22, further comprising receiving user input via the slider element to effect selecting the zoom pivot location, wherein the zoom pivot location is disposed at an arbitrary location of the current view of the data set.

24. The computer-readable medium of claim 23, wherein the slider element is configured to move in a first direction within the graphical user interface to effect the zoom operation and in a second direction within the graphical user interface to effect selecting the zoom pivot location, wherein the first direction is substantially orthogonal to the second direction.

25. A system, comprising:

a memory; and a processing unit coupled to the memory and configured to:

display a plurality of discrete zoom pivot locations within a current view of a data set, each discrete zoom pivot location corresponding to a different zoom pivot location associated with a zoom operation, display a slider element for selecting a particular discrete zoom pivot location within the plurality of discrete zoom pivot locations, the slider element displaying a plurality of discrete indicators that map to the plurality of discrete zoom pivot locations displayed within the current view of the data set, receive a request to perform the zoom operation, determine a zoom pivot location associated with the zoom operation, and perform the zoom operation relative to the zoom pivot location.

26. The system of claim 25, wherein the memory stores instructions that, when executed by the processing unit, cause the processing unit to receive the request, determine whether the zoom operation is a zoom-in operation, determine the zoom pivot location, and perform the zoom operation.

* * * * *